US008458390B2

(12) United States Patent
Mehrotra et al.

(10) Patent No.: US 8,458,390 B2
(45) Date of Patent: **\*Jun. 4, 2013**

(54) METHODS AND SYSTEMS FOR HANDLING INTER-PROCESS AND INTER-MODULE COMMUNICATIONS IN SERVERS AND SERVER CLUSTERS

(75) Inventors: Sharad Mehrotra, Saratoga, CA (US); Thomas Dean Lovett, Portland, OR (US); Cosmos Nicolaou, Palo Alto, CA (US); Nakul Pratap Saraiya, Palo Alto, CA (US); Shreyas B. Shah, San Jose, CA (US)

(73) Assignee: Oracle International Corporation, Redwood Shores, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/430,158

(22) Filed: Mar. 26, 2012

(65) Prior Publication Data

US 2013/0103880 A1     Apr. 25, 2013

Related U.S. Application Data

(63) Continuation of application No. 12/833,999, filed on Jul. 11, 2010, now Pat. No. 8,145,824, which is a continuation of application No. 10/889,468, filed on Jul. 12, 2004, now Pat. No. 7,757,033.

(60) Provisional application No. 60/563,222, filed on Apr. 17, 2004, provisional application No. 60/544,916, filed on Feb. 13, 2004.

(51) Int. Cl.
*G06F 13/24*     (2006.01)
*G06F 13/40*     (2006.01)

(52) U.S. Cl.
CPC .................................. *G06F 13/4022* (2013.01)

USPC .......................... 710/316; 710/306; 709/238

(58) Field of Classification Search
USPC ........... 710/8–19, 104–105, 306–317, 39–41; 709/238, 248, 250, 230, 236

See application file for complete search history.

(56) References Cited

U.S. PATENT DOCUMENTS

| 5,243,699 | A | 9/1993 | Nickolls et al. |
| 5,440,547 | A | 8/1995 | Easki et al. |

(Continued)

FOREIGN PATENT DOCUMENTS

| WO | 0239262 A2 | 5/2002 |
| WO | 0239262 A3 | 5/2002 |

(Continued)

OTHER PUBLICATIONS

Brian Hausauer, iWARP: Reducing Ethernet Overhead in Data Center Designs, http://www .commsdesign .com/showArticle. jhtml?articleID=51202855, Nov. 9, 2004.

(Continued)

*Primary Examiner* — Raymond Phan
(74) *Attorney, Agent, or Firm* — Kilpatrick Townsend & Stockton LLP

(57) ABSTRACT

Pluggable modules communicate via a switch fabric dataplane accessible via a backplane. Various embodiments are comprised of varying numbers and arrangements of the pluggable modules in accordance with a system architecture that provides for provisioning virtual servers and clusters of servers from underlying hardware and software resources. The system architecture is a unifying solution for applications requiring a combination of computation and networking performance. Resources may be pooled, scaled, and reclaimed dynamically for new purposes as requirements change, using dynamic reconfiguration of virtual computing and communication hardware and software.

5 Claims, 9 Drawing Sheets

U.S. PATENT DOCUMENTS

| | | |
|---|---|---|
| 5,574,914 A | 11/1996 | Hancock et al. |
| 5,581,709 A | 12/1996 | Ito et al. |
| 5,751,967 A | 5/1998 | Raab et al. |
| 5,781,549 A | 7/1998 | Dai |
| 5,892,928 A | 4/1999 | Wallach et al. |
| 5,931,938 A | 8/1999 | Drogichen et al. |
| 5,935,228 A | 8/1999 | Shinomura |
| 6,038,651 A | 3/2000 | VanHuben et al. |
| 6,061,750 A | 5/2000 | Beardsley et al. |
| 6,088,356 A | 7/2000 | Hendel et al. |
| 6,247,109 B1 | 6/2001 | Kleinsorge et al. |
| 6,260,068 B1 | 7/2001 | Zalewski et al. |
| 6,295,575 B1 | 9/2001 | Blumenau et al. |
| 6,301,257 B1 | 10/2001 | Johnson et al. |
| 6,378,021 B1 | 4/2002 | Okazawa et al. |
| 6,457,087 B1 | 9/2002 | Fu |
| 6,466,964 B1 | 10/2002 | Leung et al. |
| 6,487,605 B1 | 11/2002 | Leung |
| 6,510,496 B1 | 1/2003 | Tarui et al. |
| 6,516,442 B1 | 2/2003 | Wang et al. |
| 6,519,660 B1 | 2/2003 | Rooney |
| 6,560,228 B2 | 5/2003 | Kingsley |
| 6,564,261 B1 | 5/2003 | Gudjonsson et al. |
| 6,580,721 B1 | 6/2003 | Beshai |
| 6,594,275 B1 | 7/2003 | Schneider |
| 6,600,723 B1 | 7/2003 | Reeb et al. |
| 6,631,141 B1 | 10/2003 | Kumar et al. |
| 6,633,916 B2 | 10/2003 | Kauffman |
| 6,654,343 B1 | 11/2003 | Brandis et al. |
| 6,681,262 B1 | 1/2004 | Rimmer |
| 6,681,282 B1 | 1/2004 | Golden et al. |
| 6,684,343 B1 | 1/2004 | Bouchier et al. |
| 6,725,343 B2 | 4/2004 | Barroso et al. |
| 6,738,839 B2 | 5/2004 | Sinha |
| 6,744,654 B2 | 6/2004 | Loughmiller |
| 6,760,859 B1 | 7/2004 | Kim et al. |
| 6,791,953 B2 | 9/2004 | Ogawa et al. |
| 6,799,220 B1 | 9/2004 | Merritt et al. |
| 6,802,063 B1 | 10/2004 | Lee |
| 6,813,274 B1 | 11/2004 | Suzuki et al. |
| 6,820,174 B2 | 11/2004 | Vanderwiel |
| 6,829,684 B2 | 12/2004 | Doing et al. |
| 6,829,685 B2 | 12/2004 | Neal et al. |
| 6,851,059 B1 | 2/2005 | Pfister et al. |
| 6,862,286 B1 | 3/2005 | Tams et al. |
| 6,877,011 B2 | 4/2005 | Jaskiewicz |
| 6,904,477 B2 | 6/2005 | Padmanabhan et al. |
| 6,910,092 B2 | 6/2005 | Calvignac et al. |
| 6,941,487 B1 | 9/2005 | Balakrishnan et al. |
| 6,954,463 B1 | 10/2005 | Ma et al. |
| 6,980,552 B1 | 12/2005 | Belz et al. |
| 6,985,956 B2 | 1/2006 | Luke et al. |
| 7,003,586 B1 | 2/2006 | Bailey et al. |
| 7,007,125 B2 | 2/2006 | Barker et al. |
| 7,010,607 B1 | 3/2006 | Bunton |
| 7,020,796 B1 | 3/2006 | Ennis et al. |
| 7,023,808 B2 | 4/2006 | Ball et al. |
| 7,024,483 B2 | 4/2006 | Dinker et al. |
| 7,054,965 B2 | 5/2006 | Bell et al. |
| 7,058,071 B1 | 6/2006 | Myles et al. |
| 7,079,537 B1 | 7/2006 | Kanuri et al. |
| 7,089,293 B2 | 8/2006 | Grosner et al. |
| 7,089,587 B2 | 8/2006 | Allen et al. |
| 7,093,024 B2 | 8/2006 | Craddock et al. |
| 7,093,158 B2 | 8/2006 | Barron et al. |
| 7,103,626 B1 | 9/2006 | Recio et al. |
| 7,113,988 B2 | 9/2006 | Chirashnya et al. |
| 7,142,509 B1 | 11/2006 | Rovner et al. |
| 7,145,914 B2 | 12/2006 | Olarig et al. |
| 7,171,495 B2 | 1/2007 | Matters et al. |
| 7,188,209 B2 | 3/2007 | Pettey et al. |
| 7,197,051 B1 | 3/2007 | Ginjpalli et al. |
| 7,197,764 B2 | 3/2007 | Cichowlas |
| 7,200,704 B2 | 4/2007 | Njoku et al. |
| 7,206,860 B2 | 4/2007 | Murakami et al. |
| 7,219,183 B2 | 5/2007 | Pettey et al. |
| 7,240,098 B1 | 7/2007 | Mansee |
| 7,266,733 B2 | 9/2007 | Bazinet et al. |
| 7,308,410 B2 | 12/2007 | Bowe et al. |
| 7,313,614 B2 | 12/2007 | Considine et al. |
| 7,324,512 B2 | 1/2008 | Larson et al. |
| 7,336,605 B2 | 2/2008 | Bruckman et al. |
| 7,340,167 B2 | 3/2008 | McGlaughlin |
| 7,346,075 B1 | 3/2008 | Alexander, Jr. et al. |
| 7,398,380 B1 | 7/2008 | Lovett et al. |
| 7,406,086 B2 | 7/2008 | Deneroff et al. |
| 7,421,710 B2 | 9/2008 | Qi et al. |
| 7,428,598 B2 | 9/2008 | Arndt et al. |
| 7,437,675 B2 | 10/2008 | Casati et al. |
| 7,457,235 B2 | 11/2008 | Phaltankar |
| 7,469,243 B2 | 12/2008 | Mori et al. |
| 7,499,988 B2 | 3/2009 | Keohane et al. |
| 7,502,366 B1 | 3/2009 | Erimli et al. |
| 7,502,842 B2 | 3/2009 | Graham et al. |
| 7,529,644 B2 | 5/2009 | Lenz et al. |
| 7,586,915 B1 | 9/2009 | Indiresan et al. |
| 7,606,203 B1 | 10/2009 | Shabtay et al. |
| 7,617,378 B2 | 11/2009 | Arimilli et al. |
| 7,685,281 B1 | 3/2010 | Saraiya et al. |
| 7,730,174 B2 | 6/2010 | Keefer et al. |
| 7,757,033 B1 | 7/2010 | Mehrotra et al. |
| 7,953,074 B2 | 5/2011 | Pettey et al. |
| 7,979,552 B1 | 7/2011 | Saraiya et al. |
| 8,032,659 B2 | 10/2011 | Pettey |
| 8,145,824 B1 * | 3/2012 | Mehrotra et al. ............. 710/316 |
| 2001/0002478 A1 | 5/2001 | Grun |
| 2001/0025332 A1 | 9/2001 | Wang et al. |
| 2001/0055277 A1 | 12/2001 | Steely et al. |
| 2002/0023080 A1 | 2/2002 | Uga et al. |
| 2002/0032850 A1 | 3/2002 | Kauffman |
| 2002/0105949 A1 | 8/2002 | Shinomiya |
| 2002/0107962 A1 | 8/2002 | Richter et al. |
| 2002/0107971 A1 | 8/2002 | Bailey et al. |
| 2002/0120741 A1 | 8/2002 | Webb et al. |
| 2002/0129274 A1 | 9/2002 | Baskey et al. |
| 2002/0138698 A1 | 9/2002 | Kalla |
| 2002/0150106 A1 | 10/2002 | Kagan et al. |
| 2002/0156612 A1 | 10/2002 | Schulter et al. |
| 2002/0156613 A1 | 10/2002 | Geng et al. |
| 2002/0191615 A1 | 12/2002 | Paul et al. |
| 2003/0023701 A1 | 1/2003 | Norman et al. |
| 2003/0037224 A1 | 2/2003 | Oehler et al. |
| 2003/0046396 A1 | 3/2003 | Richter et al. |
| 2003/0061379 A1 | 3/2003 | Craddock et al. |
| 2003/0069939 A1 | 4/2003 | Russell |
| 2003/0074431 A1 | 4/2003 | Abbondanzio et al. |
| 2003/0108058 A1 | 6/2003 | Black et al. |
| 2003/0110339 A1 | 6/2003 | Calvignac et al. |
| 2003/0110369 A1 | 6/2003 | Fish et al. |
| 2003/0120852 A1 | 6/2003 | McConnell et al. |
| 2003/0130832 A1 | 7/2003 | Schulter et al. |
| 2003/0130833 A1 | 7/2003 | Brownell et al. |
| 2003/0131067 A1 | 7/2003 | Downer et al. |
| 2003/0163758 A1 | 8/2003 | Austen et al. |
| 2003/0169753 A1 | 9/2003 | Black et al. |
| 2003/0191908 A1 | 10/2003 | Cohn et al. |
| 2003/0202511 A1 | 10/2003 | Sreejith et al. |
| 2003/0208531 A1 | 11/2003 | Matters et al. |
| 2003/0208551 A1 | 11/2003 | Matters et al. |
| 2003/0208631 A1 | 11/2003 | Matters et al. |
| 2003/0208632 A1 | 11/2003 | Rimmer |
| 2003/0208670 A1 | 11/2003 | Dawkins et al. |
| 2003/0212884 A1 | 11/2003 | Lee et al. |
| 2003/0235195 A1 | 12/2003 | Shenoy et al. |
| 2003/0236745 A1 | 12/2003 | Hartsell et al. |
| 2003/0236837 A1 | 12/2003 | Johnson et al. |
| 2003/0237018 A1 | 12/2003 | Baba |
| 2004/0003063 A1 | 1/2004 | Ashok et al. |
| 2004/0003141 A1 | 1/2004 | Matters et al. |
| 2004/0017816 A1 | 1/2004 | Ishwar et al. |
| 2004/0030770 A1 | 2/2004 | Pandya |
| 2004/0073694 A1 | 4/2004 | Frank et al. |
| 2004/0076116 A1 | 4/2004 | Hefty et al. |
| 2004/0098373 A1 | 5/2004 | Bayliss et al. |
| 2004/0098518 A1 | 5/2004 | Beckett et al. |
| 2004/0103218 A1 | 5/2004 | Blumrich et al. |
| 2004/0109451 A1 | 6/2004 | Huang et al. |

| | | | |
|---|---|---|---|
| 2004/0111559 A1 | 6/2004 | Heil | |
| 2004/0143729 A1 | 7/2004 | Bouchier et al. | |
| 2004/0153708 A1 | 8/2004 | Joshi et al. | |
| 2004/0162888 A1 | 8/2004 | Reasor et al. | |
| 2004/0179476 A1 | 9/2004 | Kim et al. | |
| 2004/0193764 A1 | 9/2004 | Watanabe | |
| 2004/0210705 A1 | 10/2004 | Armstrong et al. | |
| 2004/0210734 A1 | 10/2004 | Abbey | |
| 2004/0215898 A1 | 10/2004 | Arimilli et al. | |
| 2004/0236874 A1 | 11/2004 | Largman et al. | |
| 2004/0249948 A1 | 12/2004 | Sethi et al. | |
| 2004/0255172 A1 | 12/2004 | Dayan et al. | |
| 2004/0268111 A1 | 12/2004 | Dayan et al. | |
| 2005/0005072 A1 | 1/2005 | Pruvost et al. | |
| 2005/0015655 A1 | 1/2005 | Clayton et al. | |
| 2005/0015657 A1 | 1/2005 | Sugiura et al. | |
| 2005/0018669 A1 | 1/2005 | Arndt et al. | |
| 2005/0025119 A1 | 2/2005 | Pettey et al. | |
| 2005/0034125 A1 | 2/2005 | Guy et al. | |
| 2005/0038883 A1 | 2/2005 | Elko et al. | |
| 2005/0044284 A1 | 2/2005 | Pescatore | |
| 2005/0053060 A1 | 3/2005 | Pettey | |
| 2005/0053080 A1 | 3/2005 | Wybenga et al. | |
| 2005/0060445 A1 | 3/2005 | Beukema et al. | |
| 2005/0071628 A1 | 3/2005 | Yang et al. | |
| 2005/0078685 A1 | 4/2005 | Maclean et al. | |
| 2005/0080881 A1 | 4/2005 | Voorhees et al. | |
| 2005/0080982 A1 | 4/2005 | Vasilevsky et al. | |
| 2005/0091441 A1 | 4/2005 | Qi et al. | |
| 2005/0111445 A1 | 5/2005 | Wybenga et al. | |
| 2005/0114657 A1 | 5/2005 | Kumar et al. | |
| 2005/0129045 A1 | 6/2005 | Machulsky et al. | |
| 2005/0132089 A1 | 6/2005 | Bodell et al. | |
| 2005/0143079 A1 | 6/2005 | Seto | |
| 2005/0144313 A1 | 6/2005 | Arndt et al. | |
| 2005/0160430 A1 | 7/2005 | Steely et al. | |
| 2005/0165968 A1 | 7/2005 | Natarajan et al. | |
| 2005/0240648 A1 | 10/2005 | Bird et al. | |
| 2006/0236011 A1 | 10/2006 | Narad et al. | |
| 2006/0268888 A1 | 11/2006 | Liu et al. | |
| 2006/0291462 A1 | 12/2006 | Alex et al. | |
| 2007/0067435 A1 | 3/2007 | Landis et al. | |
| 2007/0101334 A1 | 5/2007 | Atyam et al. | |
| 2007/0165648 A1 | 7/2007 | Joo | |
| 2007/0220187 A1 | 9/2007 | Kates | |
| 2007/0294732 A1 | 12/2007 | Brady et al. | |
| 2008/0008471 A1 | 1/2008 | Dress | |
| 2008/0059639 A1 | 3/2008 | Zhang | |
| 2008/0069100 A1 | 3/2008 | Weyman et al. | |
| 2008/0239957 A1 | 10/2008 | Tokura et al. | |
| 2009/0049177 A1 | 2/2009 | Iszlai et al. | |

FOREIGN PATENT DOCUMENTS

| | | |
|---|---|---|
| WO | 02069604 A2 | 9/2002 |
| WO | 02069604 A3 | 9/2002 |
| WO | 02086712 A1 | 10/2002 |
| WO | 2005/003893 A2 | 1/2005 |

OTHER PUBLICATIONS

H. T. Kung, CS143: Computer Networks (Switching and Fast Route Lookup), Harvard University, Oct. 14, 2004, 17 pgs.
K. Christensen, et al., Performance of Packet-to-Cell Segmentation Schemes in Input Buffered Packet Switches; Proceedings of the IEEE International Conference on Communications, Jun. 2004.
Simon Stanley, Switch-Fabric Chipsets, www.lightreading.com, Mar. 3, 2004, 19 pgs.
IBM: Packet Routing Switch and Common Switch Interface: PowerPRS 16G/C192, Summary Datasheet; Jun. 17, 2003.
Simon Stanley, Packet Switch Chips, www.lightreading.com, Feb. 2, 2003, 20 pgs.
Jon Maloy, Telecom Inter Process Communication, Ericsson, Jan. 31, 2003, PA6, 58 pgs.
Michael Miller and Sean Cochrane, Optimum Search Methods for Switch/Router Databases in Access and Metro Edge Networks, IDT White Paper, Jan. 27, 2003, 24 pgs.
R. Recio, et al., An RDMA Protocol Specification (Version 1.0), RDMA Consortium at http://www.rdmaconsortium.org, Oct. 21, 2002, 60 pgs.
Simon Stanley, Traffic Manager Chips, www.lightreading.com, Oct. 17, 2002, 22 pgs.
IBM; IBM PowerPRS™ 64Gu Packet Routing Switch Datasheet; Sep. 9, 2002; 167 pgs.
Simon Stanley, Network Processors, www.lightreading.com, Aug. 8, 2002, 27 pgs.
Jim Pinkerton, The Case for RDMA, RDMA Consortium, May 29, 2002, 27 pgs.
FABRIC7 Systems, Abridged Presentation for AOL, May 2, 2002, 15 pgs.
Cisco Systems, Inc., Catalyst Switch Architecture and Operation, Session RST-222, May 2002, 105 pgs.
M. Ajmone Marsan et al., Input-queued router architectures exploiting cell-based switching fabrics; Computer Networks 37, Nov. 2001, pp. 541-559.
Keith Burns, Core Router Architecture Rev 1.0, Cisco Systems, Inc., 2001.
Nick McKeown, How might optics be used in IP routers and the Internet?, Optics and Routing Seminar, Oct. 24, 2000.
Nick McKeown, A quick tutorial on IP Router design, Optics and Routing Seminar, Oct. 10, 2000.
CSIX, CSIX-L1: Common Switch Interface Specification—L1, Aug. 5, 2000, 68 pgs.
Nick McKeown and Balaji Prabhakar, High Performance Switches and Routers: Theory and Practice, Sigcomm 99, Harvard University, Aug. 30, 1999.
Nick McKeown, A Fast Switched Backplane for a Gigabit Switched Router, Business Communications Review, Dec. 1997.
Marsan, Bianco, Giaccone, Leonardi, Neri, "Packet-Mode Scheduling in Input-Queued Cell-Based Switches", IEEE/ACM Transactions on Networking, vol. 10, No. 5, Oct. 2002, 13 pages.
Irene Jacobson, Jim MacDonald, and David Du, "Experimental Analysis of VI Architecture", Technical Report, TR 00-023, Department of Computer and Science and Engineering, University of Minnesota, Mar. 29, 2000, 16 pages.
Hermann Hellwagner, Markus Lachowitz, Matthias Olenroth, Exploring the Performance of VI Architecture Communication Features in the Giganet Cluster LAN, Proceedings of the International Conference on Parallel and Distributed Processing Techniques and Applications, PDPTA2000, 2000, 7 pages.
Jenwei Hsieh, Ph.D., Tau Leng, and Yungchin Fang, "Efficient Communications Subsystems for a Cost-Effective, High Performance Beowulf Cluster", Dell Power Solutions, Issue 4, 2000, 5 pages.
Emulex, "CL1000 High Performance Host Bus Adapter", White Paper, 03-150, Dec. 2002, 2 pages.
Emulex, "CL 5000/5300 High Performance Cluster Switch", White Paper, 03-151, Dec. 2002, 2 pages.
Crowely, Patrick et al., Network Processor Design Issues and Practices, vol. 3, 2005, Chapter 5, Morgan Kaufmann Publishers, 20 pgs.
Clark, Tom, Designing Storage Area Networks, Second Edition, A Practical Reference for Implementing Fibre Channel and IP SANs, 2003, Chapters 2, 3, 4, 5, Addison-Wesley, 123 pgs.
Lekkas, Panos C., Network Processors, Articles, Protocols, and Platforms, 2003, Chapter 11, McGraw Hill, 27 pgs.
Gupta, Meet A, Storage Area Network Fundamentals, Apr. 2002, Chapter 3, Cisco Press, Indianapolis, IN, 32 pgs.
U.S. Appl. No. 10/889,467, filed Jul. 12, 2004, Notice of Abandonment mailed May 9, 2011, 3 pages.
U.S. Appl. No. 10/889,467, filed Jul. 12, 2004, Final Office Action mailed Apr. 20, 2010, 20 pages.
U.S. Appl. No. 10/889,467, filed Jul. 12, 2004, Restriction Requirement mailed Apr. 1, 2009, 7 pages.
U.S. Appl. No. 10/889,467, filed Jul. 12, 2004, Non-Final Office Action mailed Aug. 31, 2009, 17 pages.
U.S. Appl. No. 10/889,468, filed Jul. 12, 2004, Notice of Allowance mailed Dec. 14, 2009, 4 pages.
U.S. Appl. No. 10/889,468, filed Jul. 12, 2004, Non-Final Office Action mailed Apr. 3, 2009, 7 pages.
U.S. Appl. No. 10/889,469, filed Jul. 12, 2004, Notice of Abandonment mailed Mar. 3, 2009, 2 pages.
U.S. Appl. No. 10/889,469, filed Jul. 12, 2004, Non-Final Office Action mailed Feb. 20, 2008, 113 pages.

U.S. Appl. No. 11/057,034, filed Feb. 12, 2005, Notice of Abandonment mailed Dec. 6, 2011, 2 pages.
U.S. Appl. No. 11/057,034, filed Feb. 12, 2005, Non-Final Office Action mailed May 12, 2011, 16 pages.
U.S. Appl. No. 11/057,034, filed Feb. 12, 2005, Non-Final Office Action mailed Nov. 3, 2010, 18 pages.
U.S. Appl. No. 11/057,034, filed Feb. 12, 2005, Non-Final Office Action mailed Feb. 2, 2010, 16 pages.
U.S. Appl. No. 11/057,034, filed Feb. 12, 2005, Notice of Abandonment mailed Jun. 2, 2009, 4 pages.
U.S. Appl. No. 11/057,034, filed Feb. 12, 2005, Non-Final Office Action mailed Aug. 18, 2008, 14 pages.
U.S. Appl. No. 11/057,035, filed Feb. 12, 2005, Notice of Allowance mailed Sep. 28, 2010, 11 pages.
U.S. Appl. No. 11/057,035, filed Feb. 12, 2005, Non-Final Office Action mailed Feb. 17, 2010, 27 pages.
U.S. Appl. No. 11/057,035, filed Feb. 12, 2005, Notice of Appeal mailed Nov. 2, 2009, 2 pages.
U.S. Appl. No. 11/057,035, filed Feb. 12, 2005, Final Office Action mailed Jun. 1, 2009, 25 pages.
U.S. Appl. No. 11/057,035, filed Feb. 12, 2005, Non-Final Office Action mailed Aug. 8, 2008, 19 pages.
U.S. Appl. No. 11/057,036, filed Feb. 12, 2005, Notice of Appeal mailed Feb. 16, 2011, 1 page.
U.S. Appl. No. 11/057,036, filed Feb. 12, 2005, Final Office Action mailed Aug. 16, 2010, 60 pages.
U.S. Appl. No. 11/057,036, filed Feb. 12, 2005, Non-Final Office Action mailed Aug. 20, 2009, 38 pages.
U.S. Appl. No. 11/057,036, filed Feb. 12, 2005, Petition Decision mailed Jun. 6, 2005, 2 pages.
U.S. Appl. No. 11/057,037, filed Feb. 12, 2005, Notice of Abandonment mailed May 19, 2011, 2 pages.
U.S. Appl. No. 11/057,037, filed Feb. 12, 2005, Final Office Action mailed Nov. 8, 2010, 21 pages.
U.S. Appl. No. 11/057,037, filed Feb. 12, 2005, Non-Final Office Action mailed Feb. 19, 2010, 20 pages.
U.S. Appl. No. 11/057,037, filed Feb. 12, 2005, Non-Final Office Action mailed Jun. 9, 2009, 10 pages.
U.S. Appl. No. 11/057,038, filed Feb. 12, 2005, Notice of Allowance mailed Nov. 23, 2011, 8 pages.
U.S. Appl. No. 11/057,038, filed Feb. 12, 2005, Non-Final Office Action mailed Mar. 25, 2011, 14 pages.
U.S. Appl. No. 11/057,038, filed Feb. 12, 2005, Supplemental Final Office Action mailed Jun. 18, 2010, 14 pages.
U.S. Appl. No. 11/057,038, filed Feb. 12, 2005, Final Office Action mailed Mar. 2, 2010, 15 pages.
U.S. Appl. No. 11/057,038, filed Feb. 12, 2005, Non-Final Office Action mailed Apr. 3, 2009, 10 pages.
U.S. Appl. No. 11/057,046, filed Feb. 12, 2005, Notice of Abandonment mailed Aug. 3, 2010, 2 pages.
U.S. Appl. No. 11/057,046, filed Feb. 12, 2005, Final Office Action mailed Jan. 22, 2010, 30 pages.
U.S. Appl. No. 11/057,046, filed Feb. 12, 2005, Non-Final Office Action mailed Apr. 2, 2009, 25 pages.
U.S. Appl. No. 11/057,048, filed Feb. 12, 2005, Notice of Allowance mailed Dec. 1, 2009, 7 pages.
U.S. Appl. No. 11/057,048, filed Feb. 12, 2005, Non-Final Office Action mailed Mar. 19, 2009, 11 pages.
U.S. Appl. No. 11/057,112, filed Feb. 12, 2005, Notice of Allowance mailed Jan. 12, 2010, 2 pages.
U.S. Appl. No. 11/057,112, filed Feb. 12, 2005, Notice of Allowance mailed Nov. 17, 2009, 6 pages.
U.S. Appl. No. 11/057,112, filed Feb. 12, 2005, Non-Final Office Action mailed Mar. 4, 2009, 5 pages.
U.S. Appl. No. 11/057,113, filed Feb. 12, 2005, Notice of Allowance mailed Aug. 19, 2010, 17 pages.
U.S. Appl. No. 11/057,113, filed Feb. 12, 2005, Non-Final Office Action mailed Dec. 22, 2009, 8 pages.
U.S. Appl. No. 11/057,114, filed Feb. 12, 2005, Notice of Appeal mailed Oct. 13, 2011, 1 page.
U.S. Appl. No. 11/057,114, filed Feb. 12, 2005, Final Office Action mailed Apr. 13, 2011, 12 pages.
U.S. Appl. No. 11/057,114, filed Feb. 12, 2005, Final Office Action mailed Oct. 14, 2009, 21 pages.
U.S. Appl. No. 11/057,114, filed Feb. 12, 2005, Non-Final Office Action mailed Dec. 24, 2008, 20 pages.
U.S. Appl. No. 11/057,116, filed Feb. 12, 2005, Notice of Allowance mailed Aug. 17, 2010, 7 pages.
U.S. Appl. No. 11/057,116, filed Feb. 12, 2005, Non-Final Office Action mailed Dec. 1, 2009, 10 pages.
U.S. Appl. No. 11/057,116, filed Feb. 12, 2005, Restriction Requirement mailed Mar. 16, 2009, 5 pages.
U.S. Appl. No. 11/057,117, filed Feb. 12, 2005, Notice of Abandonment mailed May 16, 2011, 2 pages.
U.S. Appl. No. 11/057,117, filed Feb. 12, 2005, Non-Final Office Action mailed Oct. 12, 2010, 14 pages.
U.S. Appl. No. 11/057,117, filed Feb. 12, 2005, Restriction Requirement mailed Jun. 23, 2010, 6 pages.
U.S. Appl. No. 11/057,119, filed Feb. 12, 2005, Notice of Allowance mailed Mar. 26, 2009, 2 pages.
U.S. Appl. No. 11/057,120, filed Feb. 12, 2005, Notice of Abandonment mailed Aug. 27, 2010, 2 pages.
U.S. Appl. No. 11/057,120, filed Feb. 12, 2005, Final Office Action mailed Jan. 8, 2010, 12 pages.
U.S. Appl. No. 11/057,120, filed Feb. 12, 2005, Non-Final Office Action mailed Feb. 27, 2009, 10 pages.
U.S. Appl. No. 11/057,121, filed Feb. 12, 2005, Office of Petitions Review mailed Apr. 15, 2011, 1 page.
U.S. Appl. No. 11/057,121, filed Feb. 12, 2005, Petition Decision (Granted) mailed Apr. 11, 2011, 4 pages.
U.S. Appl. No. 11/057,121, filed Feb. 12, 2005, Notice of Abandonment mailed Jan. 28, 2011, 1 page.
U.S. Appl. No. 11/057,121, filed Feb. 12, 2005, Office of Petitions Review mailed Nov. 4, 2010, 1 page.
U.S. Appl. No. 11/057,121, filed Feb. 12, 2005, Notice of Allowance mailed Jul. 30, 2010, 4 pages.
U.S. Appl. No. 11/057,121, filed Feb. 12, 2005, Non-Final Office Action mailed Jan. 21, 2010, 7 pages.
U.S. Appl. No. 12/728,250, filed Mar. 21, 2010, Notice of Allowance mailed Mar. 3, 2011, 8 pages.
U.S. Appl. No. 11/256,645, filed Oct. 22, 2005, Notice of Allowance mailed Jul. 22, 2010, 7 pages.
U.S. Appl. No. 11/256,645, filed Oct. 22, 2005, Non-Final Office Action mailed Dec. 23, 2009, 25 pages.
U.S. Appl. No. 11/256,645, filed Oct. 22, 2005, Final Office Action mailed May 27, 2009, 22 pages.
U.S. Appl. No. 11/256,645, filed Oct. 22, 2005, Terminal Disclaimer Decision mailed Mar. 4, 2009, 1 page.
U.S. Appl. No. 11/256,645, filed Oct. 22, 2005, Non-Final Office Action mailed Jul. 9, 2008, 21 pages.
U.S. Appl. No. 11/256,668, filed Oct. 22, 2005, Notice of Abandonment mailed Aug. 2, 2011, 2 pages.
U.S. Appl. No. 11/256,668, filed Oct. 22, 2005, Notice of Appeal mailed Dec. 23, 2010, 1 page.
U.S. Appl. No. 11/256,668, filed Oct. 22, 2005, Petition for Review mailed Apr. 1, 2010, 1 page.
U.S. Appl. No. 11/256,668, filed Oct. 22, 2005, Final Office Action mailed Mar. 2, 2010, 23 page.
U.S. Appl. No. 11/256,668, filed Oct. 22, 2005, Non-Final Office Action mailed Jul. 6, 2009, 24 pages.
U.S. Appl. No. 11/256,668, filed Oct. 22, 2005, Terminal Disclaimer Decision mailed Mar. 4, 2009, 1 page.
U.S. Appl. No. 11/256,668, filed Oct. 22, 2005, Non-Final Office Action mailed Jul. 21, 2008, 20 pages.
U.S. Appl. No. 11/256,688, filed Oct. 22, 2005, Notice of Allowance mailed Jul. 23, 2010, 9 pages.
U.S. Appl. No. 11/256,688, filed Oct. 22, 2005, Non-Final Office Action mailed Dec. 23, 2009, 21 pages.
U.S. Appl. No. 11/256,688, filed Oct. 22, 2005, Final Office Action mailed Jun. 1, 2009, 22 pages.
U.S. Appl. No. 11/256,688, filed Oct. 22, 2005, Terminal Disclaimer Decision mailed Mar. 4, 2009, 1 page.
U.S. Appl. No. 11/256,688, filed Oct. 22, 2005, Non-Final Office Action mailed Jul. 9, 2008, 21 pages.

U.S. Appl. No. 11/256,269, filed Oct. 22, 2005, Notice of Allowance mailed Mar. 10, 2008, 7 pages.
U.S. Appl. No. 11/256,646, filed Oct. 22, 2005, Notice of Allowance mailed Mar. 18, 2011, 5 pages.
U.S. Appl. No. 11/256,646, filed Oct. 22, 2005, Final Office Action mailed Aug. 16, 2010, 11 pages.
U.S. Appl. No. 11/256,646, filed Oct. 22, 2005, Non-Final Office Action mailed Dec. 7, 2009, 8 pages.
U.S. Appl. No. 11/256,646, filed Oct. 22, 2005, Non-Final Office Action mailed Mar. 5, 2009, 5 pages.
U.S. Appl. No. 11/736,281, filed Apr. 17, 2007, Notice of Allowance mailed Oct. 29, 2010, 4 pages.
U.S. Appl. No. 11/736,281, filed Apr. 17, 2007, Non-Final Office Action mailed Jul. 8, 2010, 15 pages.
U.S. Appl. No. 11/736,281, filed Apr. 17, 2007, Non-Final Office Action mailed Nov. 4, 2009, 20 pages.
U.S. Appl. No. 11/736,355, filed Apr. 17, 2007, Notice of Appeal mailed May 12, 2011, 1 page.
U.S. Appl. No. 11/736,355, filed Apr. 17, 2007, Final Office Action mailed Nov. 12, 2010, 6 pages.
U.S. Appl. No. 11/736,355, filed Apr. 17, 2007, Non-Final Office Action mailed Apr. 2, 2010, 5 pages.
U.S. Appl. No. 11/337,172, filed Jan. 19, 2006, Notice of Allowance mailed Oct. 19, 2009, 15 pages.
U.S. Appl. No. 11/337,172, filed Jan. 19, 2006, Non-Final Office Action mailed Nov. 25, 2008, 24 pages.
U.S. Appl. No. 12/500,543, filed Jul. 9, 2009, Notice of Abandonment mailed Apr. 1, 2010, 2 pages.
U.S. Appl. No. 12/705,601, filed Feb. 14, 2010, Notice of Abandonment mailed Jan. 4, 2011, 2 pages.
U.S. Appl. No. 12/979,264, filed Dec. 27, 2010, Notice of Abandonment mailed Sep. 27, 2011, 2 pages.
U.S. Appl. No. 12/979,224, filed Dec. 27, 2010, Notice of Abandonment mailed Sep. 23, 2011, 2 pages.
U.S. Appl. No. 12/833,999 filed Jul. 11, 2010, Notice of Abandonment mailed Dec. 20, 2011, 5 pages.
U.S. Appl. No. 12/833,999, filed Jul. 11, 2010, Terminal Disclaimer Decision mailed Nov. 25, 2011, 15 page.
U.S. Appl. No. 12/833,999, filed Jul. 11, 2010, Non-Final Office Action mailed May 10, 2011, 6 pages.
U.S. Appl. No. 12/954,655, filed Nov. 25, 2010, Notice of Allowance mailed May 1, 2012, 5 pages.
U.S. Appl. No. 12/954,655, filed Nov. 25, 2010, Non-Final Office Action mailed Jan. 12, 2012, 35 pages.
U.S. Appl. No. 13/007,913, filed Jan. 17, 2011, Non-Final Office Action mailed Apr. 2, 2012, 8 pages.
U.S. Appl. No. 13/007,977, filed Jan. 17, 2011, Non-Final Office Action mailed Sep. 13, 2012, 7 pages.
U.S. Appl. No. 13/430,293, filed Mar. 26, 2012, Notice of Allowance mailed Jun. 21, 2012, 8 pages.
U.S. Appl. No. 13/544,696, filed Jul. 9, 2012, Non-Final Office Action mailed Oct. 31, 2012, 31 pages.
U.S. Appl. No. 13/178,486, filed Jul. 7, 2011, Notice of Allowance mailed Sep. 11, 2012, 17 pages.
U.S. Appl. No. 13/178,486, filed Jul. 7, 2011, Terminal Disclaimer Decision mailed Jul. 12, 2012, 1 page.
U.S. Appl. No. 13/178,486, filed Jul. 7, 2011, Non-Final Office Action mailed Apr. 23, 2012, 11 pages.

\* cited by examiner

METHODS AND SYSTEMS FOR HANDLING INTER-PROCESS AND INTER-MODULE COMMUNICATIONS IN SERVERS AND SERVER CLUSTERS

CROSS REFERENCE TO RELATED APPLICATIONS

Priority benefit claims for this application are made in an accompanying Application Data Sheet and as reflected on the front of the issued patent. To the extent permitted by the type of the instant application, this application incorporates by reference for all purposes the following applications, which were all commonly owned at the time of the invention of the instant application:

- U.S. Non-Provisional application Ser. No. 12/833,999, filed Jul. 11, 2010, by Thomas Dean Lovett, et al., and entitled CELL-SWITCHED INTERPARTITION COMMUNICATIONS, now U.S. Pat. No. 8,145,824;
- U.S. Non-Provisional application Ser. No. 10/889,469, filed Jul. 12, 2004, by Thomas Dean Lovett, et al., and entitled COMPUTE RESOURCES FOR FABRIC-BACKPLANE ENTERPRISE SERVERS, now abandoned;
- U.S. Non-Provisional application Ser. No. 10/889,467, filed Jul. 12, 2004, by Sharad Mehrotra, et al., and entitled CLIENT-SERVER AND APPLICATION MODELS IN FABRIC-BACKPLANE ENTERPRISE SERVERS, now abandoned;
- U.S. Non-Provisional application Ser. No. 10/889,468, filed Jul. 12, 2004, by Sharad Mehrotra, et al., and entitled DATA EXCHANGES AMONG SMP PHYSICAL PARTITIONS AND I/O INTERFACES IN ENTERPRISE SERVERS, now U.S. Pat. No. 7,757,033;
- U.S. Provisional Patent Application Ser. No. 60/563,222, filed Apr. 17, 2004), by Sharad Mehrotra, et al., and entitled DYNAMICALLY PROVISIONABLE DISTRIBUTED VIRTUAL SERVERS; and
- U.S. Provisional Patent Application Ser. No. 60/544,916, (filed Feb. 13, 2004), by Sharad Mehrotra, et al., and entitled DYNAMICALLY PROVISIONABLE DISTRIBUTED VIRTUAL SERVERS.

FIELD OF THE INVENTION

The present invention relates generally to interprocess and inter-module communications in servers and server clusters. More specifically, it relates to the organization, provisioning, management, and interoperation of compute, storage, and network resources to enhance datacenter availability, efficiency, and utilization.

BRIEF DESCRIPTION OF THE DRAWINGS

Various embodiments of the invention are disclosed in the following detailed description and the accompanying drawings.

DETAILED DESCRIPTION

Figure 1:
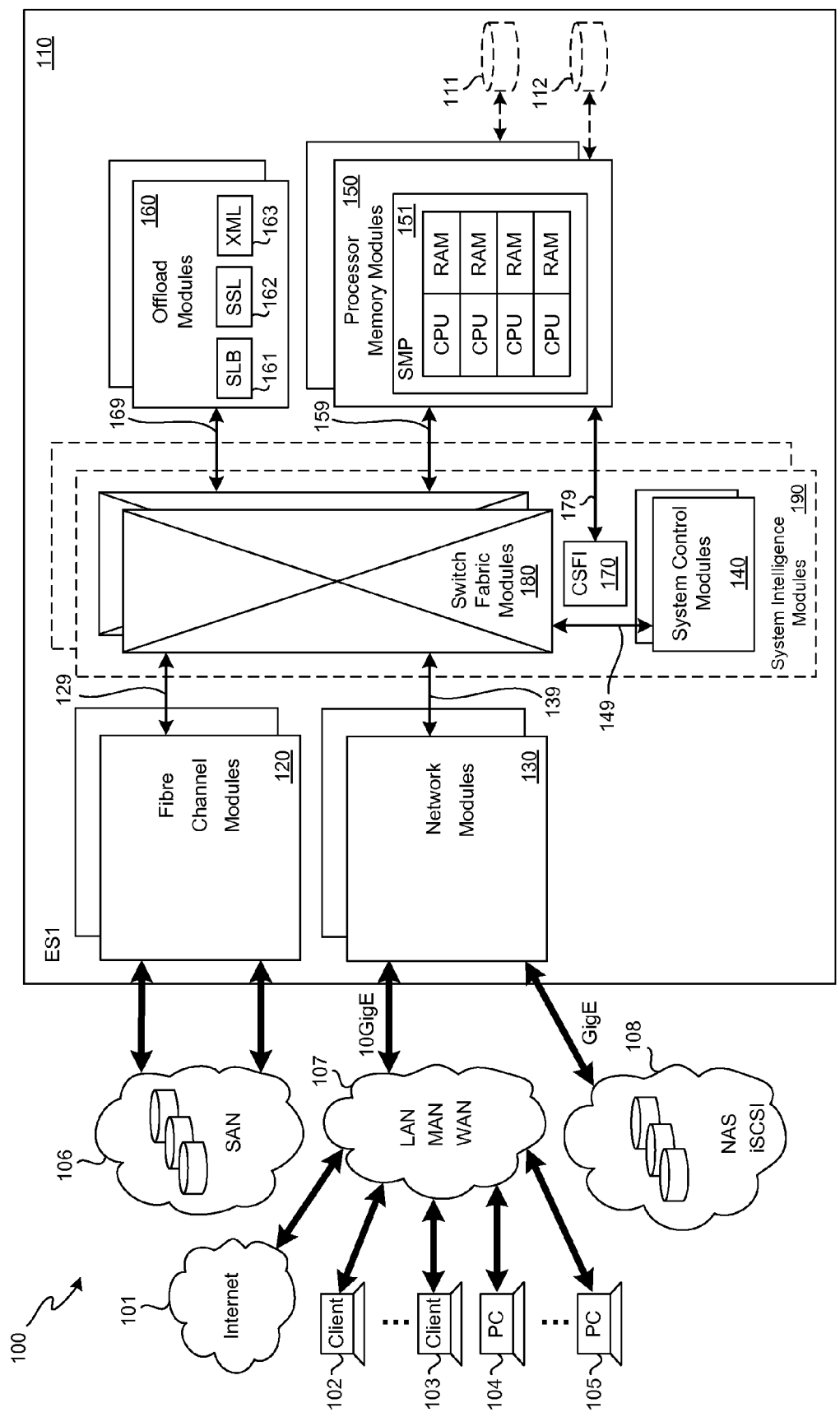
FIG. 1 illustrates a conceptual representation of an embodiment of an ES system.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification. As is discussed in more detail in the Conclusions, the invention encompasses all possible modifications and variations within the scope of the issued claims, which are appended to the very end of the issued patent.

This disclosure teaches Enterprise Server (ES) embodiments that include a plurality of pluggable modules inserted into a backplane included in a chassis. The modules communicate via a switch fabric dataplane (sometimes simply referred to as "a dataplane") accessible via the backplane (serving as a replacement for a conventional backplane bus), and hence ES embodiments are known as "fabric-backplane" enterprise servers. Various ES embodiments are comprised of varying numbers and arrangements of pluggable modules. ES embodiments are in accordance with a system architecture referred to as the Enterprise Fabric (EF) architecture. The EF architecture provides for provisioning virtual servers and clusters of servers from underlying ES hardware and software resources.

The EF architecture is a unifying solution for applications requiring a combination of computation and networking performance. Resources may be pooled, scaled, and reclaimed dynamically for new purposes as requirements change, using dynamic reconfiguration of virtual computing and communication hardware and software. This approach offers the advantages of reduced cost, as provisioning is "just-right" rather than over-provisioned. In addition, dynamic configuration allows for quick performance or scale modifications.

The EF architecture provides a radically different underlying server architecture compared to traditional multi-way Symmetric MultiProcessor (SMP) servers, including integrated fabric interconnectivity to enable high-bandwidth, low-latency Input/Output (I/O) operation. Processing and I/O throughput are virtualized, providing scalable, coordinated resources. Partitioning and fail-over are hardware supported, including mechanisms for treating multiple virtual servers as a single managed entity, resulting in new high availability clustering and multi-site fail-over capabilities. Compared to a current network switch, networking capabilities are extended, including efficient Remote Direct Memory Access (RDMA) and flexible resource pooling. Virtualized fabric services, such as Server Load Balancing (SLB), Secure Sockets Layer (SSL) protocols including Transport Layer Security (TLS) variants, eXtensible Markup Language (XML), and so forth, are also provided.

In preferred embodiments, a data center or other installation implemented in accordance with the EF architecture, will include one or more ES chassis. In a first embodiment, the ES chassis capabilities include an 8-way SMP partition-configurable compute complex. These compute resources include a plurality of 64-bit x86 processing elements. The ES chassis hardware configuration is compatible with execution of software operating systems such as Linux and Microsoft Windows. Processing elements in the ES chassis are coupled to a low-latency high-bandwidth interconnect fabric, providing for efficient communication between processing elements and virtualized I/O functions. The virtualized I/O functions are distributed throughout the plurality of processing elements. Among the virtualized I/O functions, the ES chassis includes virtualized Network Interface Cards (vNICs) and virtualized Host Bus Adaptors (vHBAs). Via these vNICs and vHBAs, the processing elements can respectively locally access the capabilities of multiple remote 10 Gb Ethernet media interfaces (up to three in the first embodiment) and multiple remote 2 Gb Fibre Channel interfaces (up to eight in the first embodiment). In other words, the processing elements can access network and storage interfaces that are external to the module of the processing elements as though those interfaces were located internal to the module of the processing elements. These network and storage interfaces may be located physically at least within the same chassis as the processing elements. Additional processing capabilities may be provided in the chassis in the form of offload cards supporting virtualized services, such as SLB, SSL, and XML processing.

The ES chassis is further configured with capabilities to provide for a high availability system, including modular components, hot-swap of components, and fully redundant components. Other high availability capabilities include multi-site fail-over and mainframe class Reliability, Availability, and Serviceability (RAS) features.

The EF architecture further includes a Graphical User Interface (GUI) via a web browser, for configuration management. The GUI provides role-based access and division of functions, and may be used as a single point of management for all EF system functions. System management personnel may use the GUI to control EF virtualized configuration and provisioning settings. Resource pooling and allocation of CPU and IO capabilities may be dynamically altered without requiring physical changes or re-cabling. Network and storage capabilities may be similarly dynamically modified, including NIC, HBA, and bandwidth resources. Redundancy, fail-over and other RAS capabilities may also be configured via the GUI, including specific multi-site configuration information.

The GUI further provides functions for monitoring various aspects of the hardware and software performance and behavior of systems including each ES chassis. The monitoring functions are available for inspection of operations at several levels in the system, from top-level application performance to low-level network interconnect metrics.

The GUI provides hooks for integration of the functions provided therein into higher-level application software and standard applications, allowing for flexibility in specifying and monitoring the EF system configuration.

EF configuration management and monitoring may also be performed via other mechanisms. Alternate mechanisms include a command line interface, a scripting based interface, and remote network-centric interfaces using standard capabilities provided for in Simple Network Management Protocol (SNMP) and Remote MONitoring (RMON).

Systems including EF capabilities may also provide for upgrades to installed software, including operating system software, application software, driver-level software, and firmware software. The upgrades may include updates to address security issues, to enable new or expanded functionality, or to repair incorrect operation (a "bug fix"). A variety of sources may provide upgrades, including EF vendors, or vendors of software installed or used in EF-based systems. Additionally, Independent Software Vendor (ISV) certifications of software associated with EF-based systems may also be performed.

Illustrative application usage scenarios include a first usage scenario including a first configuration adapted to replace a Unix server or a collection of such servers. The first configuration provides for virtualization of data center capabilities, resource pooling, and consolidation of functions otherwise performed in a plurality of heterogeneous devices. Computing, networking, and services are completely virtualized, enabling dynamic deployment, scaling, and reclamation according to changing application requirements. Significant savings in capital and operating expense result.

A second usage scenario includes a second configuration adapted for I/O intensive applications. The second configuration provides high-bandwidth and low-latency storage and networking capabilities, enabling new classes of applications using fewer infrastructure components than currently possible. The high-bandwidth and low-latency capabilities are enabled in part by use of a high-bandwidth, low-latency fabric. Efficient intra-chassis communication is provided for in a transparent manner, enabling increased I/O bandwidth and reduced latency compared to existing solutions.

A third usage scenario includes a third configuration adapted for consolidating tiers in a data center application. The third configuration provides for collapsing the physical divisions in present 3-tier data centers, enabling solutions with fewer servers, a smaller number of network switches, and reduced needs for specialized appliances. The concepts taught herein provide for completely virtualized computing, networking, and services, in contrast to existing solutions addressing tiered data systems. Dynamic configuration enables pooling of resources and on-the-fly deploying, scaling, and reclaiming of resources according to application requirements, allowing for reduced infrastructure requirements and costs compared to existing solutions.

A fourth usage scenario includes a fourth configuration adapted for enhanced high availability, or RAS functionality, including multi-site fail-over capabilities. The fourth configuration provides for new redundancy and related architectures. These new architectures reduce set-up and configuration time (and cost), and also decrease on-going operating expenses. Modular components of the ES chassis are hot-swap compatible and all EF systems are configured with fully redundant components, providing for mainframe-class RAS functionality. Reduced networking latency capabilities enable enhanced multi-site fail-over operation.

The concepts taught herein thus enable simple, fast, straightforward, low-effort deployment of systems configured and provisioned for efficient execution of heterogeneous mixes of applications requiring varying computing, networking, and I/O processing resources. Application fail-over architectures are also readily enabled with little or no additional hardware, according to further dynamic partitioning features. Accordingly, Information Technology (IT) operations are reduced in complexity and cost.

The concepts taught herein consolidate multiple devices and tiers in data center operations, requiring fewer servers (in type and quantity), reduced supporting hardware, and smaller infrastructure outlays compared to systems of the current art. Significant reductions in the total cost of ownership are thus provided for by the concepts taught herein.

The concepts taught herein, ensure highly reliable and available compute, network, storage, and application resources while also dramatically improving storage and networking performance and reliability. True multi-site fail-over and disaster recovery are possible by use of the concepts taught herein, enabling new classes of I/O and high availability applications.

Illustrative Combinations

The following is a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A system comprising a virtualizable compute capability configured to execute an application; a virtualizable resource; an interconnection fabric coupled to the virtualizable compute capability and the virtualizable resource; and wherein the interconnection fabric is configured to communicate application data between the virtualizable compute capability and the virtualizable resource. The foregoing system wherein the virtualizable resource includes a virtualizable storage resource. The foregoing system wherein the virtualizable resource includes a virtualizable network resource.

A system comprising a switch fabric; a virtualizable compute capability coupled to the switch fabric; a virtualizable network resource coupled to the switch fabric; a virtualizable storage resource coupled to the switch fabric; and wherein the virtualizable compute capability, the virtualizable network resource, and the virtualizable storage resource are configured to communicate as peers on the switch fabric. The foregoing system wherein the virtualizable compute capability includes a symmetric multiprocessor. The foregoing system wherein the virtualizable compute capability is configured with a fabric address associated with the switch fabric. The foregoing system wherein the system is configured to associate a MAC address with the fabric address. The foregoing system wherein the system is configured to associate an IP address with the MAC address. The foregoing system wherein the compute capability includes a memory and the system includes a Direct Memory Access (DMA) engine configured to receive a memory transaction message addressed to the IP address and read/write the memory according to the memory transaction message.

A method comprising receiving a virtual server template; allocating hardware from a hardware resource pool according to requirements of the template; allocating software from a software resource pool according to the template requirements; and providing a virtual server specification wherein the hardware allocated and the software allocated is specified.

A method comprising receiving a virtual server specification; configuring hardware according to the specification; configuring software according to the specification; and starting the virtual server. The foregoing method wherein configuring the hardware includes programming a packet interface. The foregoing method wherein configuring the hardware includes programming a coherency interface. The foregoing method wherein configuring the hardware includes initializing routing tables. The foregoing method wherein configuring the software includes selecting a boot image. The foregoing method wherein configuring the software includes selecting an application image. The foregoing method wherein starting the virtual server includes loading and executing a boot image.

A method comprising receiving notification freeing a virtual server; stopping the virtual server; and freeing hardware and software resources associated with the virtual server. The foregoing method wherein stopping the virtual server includes waiting for completion of work in progress. The foregoing method wherein stopping the virtual server includes preventing initiation of new work. The foregoing method wherein freeing hardware includes returning hardware allocated to the virtual server to a hardware resource pool. The foregoing method wherein freeing software includes returning software allocated to the virtual server to a software resource pool.

A virtual server architecture comprising virtualized resources; a switch fabric; a control manager; and wherein each of a plurality of virtual servers is built from at least one virtualized compute resource and one virtualized storage resource.

The foregoing architecture wherein the virtualized resources are distributed across at least two circuit boards. The foregoing architecture wherein the virtualized resources are classified according to resource type and the virtualized resources are segregated on circuit boards according to the classification. The foregoing architecture wherein the classification is a compute, network, storage, or special function resource classification. The foregoing architecture wherein each virtualized resource is located on a separate circuit board.

The foregoing architecture wherein the hardware resource pool includes the hardware resources of at least a first chassis. The foregoing architecture wherein a virtual server specification may be dynamically instantiated in a first configuration within the first chassis that is used for a first interval of time, the first configuration becoming subsequently unused for a second interval of time, the virtual server specification being dynamically instantiated in a second configuration within the first chassis that is used for a third interval of time. The foregoing architecture wherein the beginning of the second and third intervals overlap. The foregoing architecture wherein the switchover from the first configuration to the second configuration is a failover response to a problem with the virtual server observed during the first interval of time. The foregoing architecture wherein the switchover from the first configuration to the second configuration is a response to a change in at least one monitored variable.

The foregoing architecture wherein the hardware resource pool includes the hardware resources of at least two chassis. The foregoing architecture wherein a virtual server specification may be dynamically instantiated in a first configuration that is used for a first interval of time, the first configuration becoming subsequently unused for a second interval of time, the virtual server specification being dynamically instantiated in a second configuration that is used for a third interval of time. The foregoing architecture wherein the beginning of the second and third intervals overlap. The foregoing architecture wherein the switchover from the first configuration to the second configuration is a failover response to a problem with the virtual server observed during the first interval of time. The foregoing architecture wherein the switchover from the first configuration to the second configuration is a response to a change in at least one monitored variable.

The foregoing architecture wherein the hardware resource pool includes the hardware resources of at least two data centers. The foregoing architecture wherein a virtual server specification may be dynamically instantiated in a first configuration in a first data center that is used for a first interval of time, the first configuration becoming subsequently unused for a second interval of time, the virtual server specification being dynamically instantiated in a second configuration in a second data center that is used for a third interval of time. The foregoing architecture wherein the beginning of the second and third intervals overlap. The foregoing architecture wherein the switchover from the first configuration to the second configuration is a failover response to a problem with the virtual server observed during the first interval of time. The foregoing architecture wherein the switchover from the first configuration to the second configuration is a response to a change in at least one monitored variable.

The foregoing architecture wherein the hardware resource pool includes the hardware resources of at least two sites. The foregoing architecture wherein a virtual server specification may be dynamically instantiated in a first configuration at a first site that is used for a first interval of time, the first configuration becoming subsequently unused for a second interval of time, the virtual server specification being dynamically instantiated in a second configuration at a second site that is used for a third interval of time. The foregoing architecture wherein the beginning of the second and third intervals overlap. The foregoing architecture wherein the switchover from the first configuration to the second configuration is a failover response to a problem with the virtual server observed during the first interval of time. The foregoing architecture wherein the switchover from the first configuration to the second configuration is a response to a change in at least one monitored variable.

The foregoing architecture wherein the hardware resource pool includes the hardware resources of at least two campuses. The foregoing architecture wherein a virtual server specification may be dynamically instantiated in a first configuration at a first campus that is used for a first interval of time, the first configuration becoming subsequently unused for a second interval of time, the virtual server specification being dynamically instantiated in a second configuration at a second campus that is used for a third interval of time. The foregoing architecture wherein the beginning of the second and third intervals overlap. The foregoing architecture wherein the switchover from the first configuration to the second configuration is a failover response to a problem with the virtual server observed during the first interval of time. The foregoing architecture wherein the switchover from the first configuration to the second configuration is a response to a change in at least one monitored variable.

The foregoing architecture wherein the hardware resource pool includes the hardware resources of at least two postal addresses. The foregoing architecture wherein a virtual server specification may be dynamically instantiated in a first configuration at a first postal address that is used for a first interval of time, the first configuration becoming subsequently unused for a second interval of time, the virtual server specification being dynamically instantiated in a second configuration at a second postal address that is used for a third interval of time. The foregoing architecture wherein the beginning of the second and third intervals overlap. The foregoing architecture wherein the switchover from the first configuration to the second configuration is a failover response to a problem with the virtual server observed during the first interval of time. The foregoing architecture wherein the switchover from the first configuration to the second configuration is a response to a change in at least one monitored variable.

The foregoing architecture wherein the hardware resource pool includes the hardware resources of at least two sub-nets. The foregoing architecture wherein a virtual server specification may be dynamically instantiated in a first chassis configuration on a first sub-net that is used for a first interval of time, the first chassis configuration becoming subsequently unused for a second interval of time, the virtual server specification being dynamically instantiated in a second chassis configuration on a second sub-net that is used for a third interval of time. The foregoing architecture wherein the beginning of the second and third intervals overlap. The foregoing architecture wherein the instantiation of the second chassis configuration is a failover response to a problem with the virtual server observed during the first interval of time.

The foregoing architecture wherein the switch fabric provides selective coupling of the virtualized resources. The foregoing architecture wherein the switch fabric comprises conventional switch fabric components. The foregoing architecture wherein the switch fabric is scalable over a wide range. The foregoing architecture wherein the switch fabric is configured with sufficient over-bandwidth to provide for low-latency.

The foregoing architecture wherein the virtualized compute resource comprises a processor memory module. The foregoing architecture wherein the processor memory module includes at least one symmetric multiprocessor complex. The foregoing architecture wherein the processor memory module includes a portion of main memory.

The foregoing architecture further comprising a virtualized network resource. The foregoing architecture wherein the virtualized network resource includes a virtual network interface card.

The foregoing architecture wherein the virtualized storage resource includes network attached storage. The foregoing architecture wherein the virtualized storage resource includes an OS image from which at least one of the plurality of virtual servers is booted.

The foregoing architecture wherein the virtualized resources include special function resources. The foregoing architecture wherein the special function resources include an off-load module. The foregoing architecture wherein the off-load module is configured for SSL processing. The foregoing architecture wherein the off-load module is configured for XML processing. The foregoing architecture wherein the off-load module is configured for server load balancing.

The foregoing architecture wherein each of the virtualized resources comprising each virtual server is coupled via the switch fabric. The foregoing architecture wherein the mapping between each of the virtual servers and physical modules that provide the associated virtualized resources is arbitrary. The foregoing architecture wherein the mapping between each of the virtual servers and physical modules that provide the associated virtualized resources is programmatic. The foregoing architecture wherein each of the virtualized resources in each of the virtual servers may be arbitrarily physically located within a chassis. The foregoing architecture wherein the latency between the virtualized resources is below a threshold that substantially degrades execution of OS functions.

A method comprising on demand programmatic setting-up and booting of virtual servers; wherein the setting-up includes providing a geographically distributed pool of chassis-based latent virtual resources, selecting a "server description" having attributes of a desired virtual server, and programmatically configuring one or more virtual servers per chassis from the pool of resources based on the attributes. The foregoing method further including tearing-down the configured virtual servers, wherein tearing-down includes returning virtual resources used by the configured virtual servers to the pool of resources. The foregoing methods wherein the virtual servers are coupled by a virtual network. The foregoing method wherein the virtual network is a VLAN. The foregoing method wherein the virtual network is a sub-net.

A method comprising on-demand programmatic setting-up and booting of clusters of virtual servers, wherein the setting-up includes providing a geographically distributed pool of chassis-based latent virtual resources, selecting a "cluster description" having attributes of a desired cluster of virtual servers, and programmatically configuring a cluster of virtual servers from the pool of resources based on the attributes, one or more virtual servers being configured per chassis. The foregoing method further including tearing-down the configured cluster of virtual servers, wherein tearing-down includes returning virtual resources used by the configured cluster of virtual servers to the pool of resources. The foregoing methods wherein the clusters of virtual servers are coupled by a virtual network. The foregoing method wherein the virtual network is a VLAN. The foregoing method wherein the virtual network is a sub-net.

A method comprising on demand programmatic setting-up and booting of virtual servers; and managing the setting-up and booting, wherein each virtual server is contained within a single chassis and the managing is via a single network operations center. The foregoing method wherein the single-chassis virtual servers are located within a single data center. The foregoing method wherein the single-chassis virtual servers are located within multiple data centers. The foregoing method wherein the single-chassis virtual servers are distributed cross-campus. The foregoing method wherein the single-chassis virtual servers are distributed worldwide.

A method comprising on demand programmatic setting-up and booting of virtual servers, wherein virtualized resources are allocated to the virtual servers according to observed workload.

A method of managing a pool of virtualized resources, the method comprising maintaining the pool of virtualized resources; receiving a request associated with running an application; selecting at least one "server description" having attributes sufficient for running the application; configuring one or more virtual servers from the pool of virtualized resources according to the selected "server description" as required to satisfy the request; running the application; and returning the virtualized resources of the configured servers to the pool when the application is no longer needed.

Any of the foregoing methods wherein at least one virtual server implements a web-server. Any of the foregoing methods wherein at least one virtual server implements an application-server. Any of the foregoing methods wherein at least one virtual server implements a database server. Any of the foregoing methods wherein a plurality of virtual servers are configured to implement a multi-layer server system. The foregoing method wherein the system includes a web-server and an application-server. The foregoing method wherein the multi-layer server system includes a web-server, an application-server, and a database server. The foregoing method wherein the configuration of the virtual servers is carried out programmatically as a unified process from a user's perspective. The foregoing method wherein the configuration is simultaneous for all of the virtual servers.

A method comprising on-demand programmatic setting-up and booting of virtual servers, wherein the setting-up includes configuring the virtual servers for graceful fail-over.

A method comprising on demand programmatic setting-up and booting of virtual servers, wherein the setting-up includes configuring the virtual servers according to an application-level mirroring architecture.

A method comprising on demand programmatic setting-up, booting, and failing-over of virtual servers, wherein the setting-up includes selecting a "server description" having attributes of a desired virtual server and the failing-over includes disaster recovery based at least in part on the selected "server description".

A method comprising allocating virtualized resources to configure a virtual server, and billing based on the allocation.

Any of the foregoing methods wherein the "server description" includes a desired IP address. Any of the foregoing methods wherein the "server description" includes a desired storage size. Any of the foregoing methods wherein the "server description" includes a desired number of processors. Any of the foregoing methods wherein the "server description" includes a desired memory size. Any of the foregoing methods wherein the "server description" includes a desired maximum bandwidth. Any of the foregoing methods wherein the "server description" includes a desired minimum bandwidth. Any of the foregoing methods wherein the "server description" includes a cluster membership identification. Any of the foregoing methods wherein the "server description" is selected from a repository of known good templates. Any of the foregoing methods wherein the repository is a central repository.

Any of the foregoing methods wherein at least one of the virtual servers participates in network traffic that includes at least one encrypted compressed XML stream.

A method of directing a packet to a process executing on an SMP, the method comprising in an input/output interface, receiving a packet; dividing the packet into a plurality of cells wherein each cell has a fabric address specifying an egress port of a switch fabric; routing each cell through the switch fabric in accordance with each cell fabric address; forming the cells into a reconstructed packet provided to the process executing on the SMP. The foregoing method wherein the packet includes a destination address and each cell fabric address is based at least in part on the packet destination address. The foregoing methods wherein the SMP may be configured to have either one or a plurality of physical partitions. The foregoing methods wherein the process executes in one of the physical partitions. The foregoing methods wherein the input/output interface includes at least one of a network interface and a storage interface. The foregoing methods wherein the reconstructed packet is directly provided to the process executing on the SMP. The foregoing methods wherein the directly providing the reconstructed packet to the process includes data transfers according to a direct memory access protocol.

A method of directing a packet from a process executing on an SMP, the method comprising receiving a packet from the process; dividing the packet into a plurality of cells wherein each cell has a fabric address specifying an egress port of a switch fabric; routing each cell through the switch fabric in accordance with each cell fabric address; and forming the cells into a reconstructed packet provided to an input/output interface. The foregoing method wherein the packet includes a destination address and each cell fabric address is based at least in part on the packet destination address. The foregoing methods wherein the SMP may be configured to have either one or a plurality of physical partitions. The foregoing methods wherein the process executes in one of the physical partitions. The foregoing methods wherein the input/output interface includes at least one of a network interface and a storage interface. The foregoing methods wherein the packet is received directly from the process executing on the SMP. The foregoing methods wherein the directly receiving the packet from the process includes data transfers according to a direct memory access protocol.

A method of interprocess communication comprising receiving a packet having a destination address from a send process; dividing the packet into a plurality of cells wherein each cell has a fabric address specifying an egress port of a switch fabric; routing each cell through the switch fabric in accordance with each cell fabric address; and forming the cells into a reconstructed packet provided to a receive process. The foregoing method wherein the packet includes a destination address and each cell fabric address is based at least in part on the packet destination address. The foregoing methods wherein the send process and the receive process execute on an SMP. The foregoing methods wherein the SMP may be configured to have either one or a plurality of physical partitions. The foregoing methods wherein the SMP is configured to have at least two physical partitions, the send process executes on the first physical partition, and the receive process executes on the second physical partition. The foregoing methods wherein the reconstructed packet is provided directly to the receive process. The foregoing methods wherein the directly providing the reconstructed packet to the receive process includes data transfers according to a direct memory access protocol. The foregoing methods wherein the packet is received directly from the send process. The foregoing methods wherein the directly receiving the packet from the send process includes data transfers according to a direct memory access protocol.

A method of performing communication between a server and a client coupled via a network, the method comprising in a network module, having a network interface coupled to the network and having a network fabric interface connected to a switch fabric, receiving a packet from the client via the network interface, providing the packet to the network fabric interface, the network fabric interface cellifying the packet into cells and emitting the cells to the switch fabric, each cell having a respective fabric address specifying an egress port of the switch fabric; in the switch fabric, receiving the cells and routing each cell in accordance with its respective fabric address; and in a compute module, having a compute fabric interface connected to the switch fabric and a symmetric multiprocessor connected to the compute fabric interface, the compute fabric interface receiving the cells, forming the received cells into a reconstructed packet, and providing the reconstructed packet to a process of the server executing on the symmetric multiprocessor.

The foregoing method wherein each fabric address is based at least in part on a packet destination address included within the packet. The foregoing methods wherein the symmetric multiprocessor is programmable as a selected one of at least a first configuration having one physical partition and a second configuration having a plurality of physical partitions. The foregoing methods wherein the reconstructed packet is provided directly to the process. The foregoing methods wherein the client includes at least one of a mass storage array, another server, and a personal computer. The foregoing methods wherein the network includes at least one of a storage area network, a local area network, a metro area network, a wide area network, and the Internet. The foregoing methods wherein the directly providing the reconstructed packet to the process includes data transfers according to a direct memory access protocol.

A method of performing communication between a server and a client coupled via a network, the method comprising in a compute module, having a compute fabric interface connected to a switch fabric and a symmetric multiprocessor connected to the compute fabric interface, the compute fabric interface receiving a packet from a process of the server executing on the symmetric multiprocessor, the compute fabric interface cellifying the packet into cells and emitting the cells to the switch fabric, each cell having a respective fabric address specifying an egress port of the switch fabric; in the switch fabric, receiving the cells and routing each cell in accordance with its respective fabric address; and in a network module, having a network interface coupled to the network and having a network fabric interface connected to the switch fabric, the network fabric interface receiving the cells, forming the received cells into a reconstructed packet, and sending the packet to the client via the network interface.

The foregoing method wherein each fabric address is based at least in part on a packet destination address included within the packet. The foregoing methods wherein the symmetric multiprocessor is programmable as a selected one of at least a first configuration having one physical partition and a second configuration having a plurality of physical partitions. The foregoing methods wherein the compute fabric interface directly receives the packet. The foregoing methods wherein the client includes at least one of a mass storage array, another server, and a personal computer. The foregoing methods wherein the network includes at least one of a storage area network, a local area network, a metro area network, a wide area network, and the Internet. The foregoing methods wherein the compute fabric interface directly receiving the packet includes data transfers according to a direct memory access protocol.

A method of performing communication between a server and a client coupled via a network, the method comprising in a network module, having a network interface coupled to the network and having a network fabric interface connected to a switch fabric, receiving a client-to-server packet from the client via the network interface, providing the client-to-server packet to the network fabric interface, the network fabric interface cellifying the packet into client-to-server cells and emitting the client-to-server cells to the switch fabric, each cell having a respective fabric address specifying an egress port of the switch fabric; in a compute module, having a compute fabric interface connected to the switch fabric and a symmetric multiprocessor connected to the compute fabric interface, the compute fabric interface receiving a server-to-client packet from a send process executing on the symmetric multiprocessor, the compute fabric interface cellifying the server-to-client packet into server-to-client cells and emitting the server-to-client cells to the switch fabric, each cell having a respective fabric address specifying an egress port of the switch fabric, each fabric address being based at least in part on a server-to-client packet destination address included within the server-to-client packet; in the switch fabric, receiving the server-to-client cells and the client-to-server cells and routing each cell in accordance with its respective fabric address; in the network module, the network fabric interface receiving the server-to-client cells, forming the received server-to-client cells into a reconstructed server-to-client packet, and sending the server-to-client packet to the client via the network interface; in the compute module, the compute fabric interface receiving the client-to-server cells, forming the received client-to-server cells into a reconstructed client-to-server packet, and providing the reconstructed client-to-server packet to a receive process executing on the symmetric multiprocessor.

The foregoing method wherein each fabric address is based at least in part on a packet destination address included within the packet. The foregoing methods wherein the symmetric multiprocessor is programmable as a selected one of at least a first configuration having one physical partition and a second configuration having a plurality of physical partitions. The foregoing methods wherein the compute fabric interface directly receives the server-to-client packet. The foregoing methods wherein the reconstructed client-to-server packet is directly provided to the receive process. The foregoing methods wherein the client includes at least one of a mass storage array, another server, and a personal computer. The foregoing methods wherein the network includes at least one of a storage area network, a local area network, a metro area network, a wide area network, and the Internet. The foregoing methods wherein the compute fabric interface directly receiving the server-to-client packet includes data transfers according to a direct memory access read protocol. The foregoing methods wherein directly providing the reconstructed client-to-server packet includes data transfers according to a direct memory access write protocol.

A method of performing communication within a server, the method comprising in a first compute module, having a first fabric interface connected to a switch fabric and a first symmetric multiprocessor connected to the first fabric interface, the first fabric interface receiving a first-to-second packet from a first send process executing on the first symmetric multiprocessor, the first fabric interface cellifying the first-to-second packet into first-to-second cells and emitting the first-to-second cells to the switch fabric, each cell having a respective fabric address specifying an egress port of the switch fabric; in a second compute module, having a second fabric interface connected to the switch fabric and a second symmetric multiprocessor connected to the second fabric interface, the second fabric interface receiving a second-to-first packet from a second send process executing on the second symmetric multiprocessor, the second fabric interface cellifying the second-to-first packet into second-to-first cells and emitting the second-to-first cells to the switch fabric, each cell having a respective fabric address specifying an egress port of the switch fabric, each fabric address being based at least in part on a second-to-first packet destination address included within the second-to-first packet; in the switch fabric, receiving the first-to-second cells and the second-to-first cells and routing each cell in accordance with its respective fabric address; in the first compute module, the first compute fabric interface receiving the second-to-first cells, forming the received second-to-first cells into a reconstructed second-to-first packet, and providing the reconstructed second-to-first packet to a first receive process executing on the first symmetric multiprocessor; in the second compute module, the second compute fabric interface receiving the first-to-second cells, forming the received first-to-second cells into a reconstructed first-to-second packet, and directly providing the reconstructed first-to-second packet to a second receive process executing on the second symmetric multiprocessor.

The foregoing method wherein each first-to-second cell fabric address is based at least in part on a first-to-second packet destination address included within the first-to-second packet and each second-to-first cell fabric address is based at least in part on a second-to-first packet destination address included within the second-to-first packet. The foregoing methods wherein each of the first symmetric multiprocessor and the second symmetric multiprocessor are programmable as a selected one of at least a first configuration having one physical partition and a second configuration having a plurality of physical partitions. The foregoing methods wherein the first fabric interface directly receives the first-to-second packet and the second fabric interface directly receives the second-to-first packet. The foregoing methods wherein the reconstructed second-to-first packet is provided directly to the first receive process and the reconstructed first-to-second packet is provided directly to the second receive process. The foregoing methods wherein the directly receiving the first-to-second packet and the directly receiving the first-to-second packet include data transfers via a direct memory access read protocol. The foregoing methods wherein the directly providing the reconstructed second-to-first packet and the directly providing the reconstructed first-to-second packet include data transfers via a direct memory access write protocol.

A method of performing communication within a server, and between the server and a plurality of elements, the elements including a first client coupled via a first network, a second client coupled via a second network, a first mass storage array coupled via a first storage network, and a second mass storage array coupled via a second storage network, the server including a switch fabric, the method comprising in each of a first network module and a second network module, each network module having a corresponding network interface adapted to couple respectively to the first network and the second network, each network module further having a corresponding network fabric interface connected to the switch fabric, receiving packets from the client coupled to the corresponding network interface via the corresponding network, and providing the packets to the corresponding network fabric interface; in each of a first storage module and a second storage module, each storage module having a corresponding storage interface adapted to couple respectively to the first storage network and the second storage network, each storage module further having a corresponding storage fabric interface connected to the switch fabric, receiving packets from the storage array coupled to the corresponding storage interface via the corresponding storage network, and providing the packets to the corresponding storage fabric interface; in each of a first compute module and a second compute module, each compute module having a corresponding compute fabric interface connected to the switch fabric and a corresponding symmetric multiprocessor connected to the corresponding compute fabric interface, receiving packets from a corresponding send process executing on the corresponding symmetric multiprocessor, and providing the packets to the corresponding compute fabric interface; in each fabric interface, cellifying the provided packets into cells, and emitting the cells to the switch fabric, each cell having a respective fabric address specifying an egress port of the switch fabric; in the switch fabric, receiving cells and routing each cell in accordance with its respective fabric address; in each network module, the corresponding network fabric interface receiving cells from the switch fabric, forming the received cells into reconstructed packets, and sending the reconstructed packets to the corresponding client via the corresponding network interface; in each storage module, the corresponding storage fabric interface receiving cells from the switch fabric, forming the received cells into reconstructed packets, and sending the reconstructed packets to the corresponding storage array via the corresponding storage interface; in each compute module, the corresponding compute fabric interface receiving cells from the switch fabric, forming the received cells into reconstructed packets, and providing the reconstructed packets to a receive process executing on the corresponding symmetric multiprocessor.

The foregoing method wherein each fabric address is based at least in part on a destination address included within the corresponding packet. The foregoing methods wherein each of the symmetric multiprocessors are programmable as a selected one of at least a first configuration having one physical partition and a second configuration having a plurality of physical partitions. The foregoing methods wherein packets are directly received from at least one of the send processes. The foregoing methods wherein reconstructed packets are directly provided to at least one of the receive processes. The foregoing methods wherein the directly receiving packets includes data transfers via a direct memory access read protocol. The foregoing methods wherein the directly providing the reconstructed packets includes data transfers via a direct memory access write protocol. The foregoing methods wherein the packets received from the send process executing on the symmetric multiprocessor of the first compute module include packets having destination addresses corresponding to any combination of recipients, the recipients including the first compute module, the second compute module, the first network module, the second network module, the first storage module, and the second storage module. The foregoing methods wherein the packets provided by the first network module to the first network fabric interface include packets having destination addresses corresponding to any combination of recipients, the recipients including the first compute module, the second compute module, the first network module, the second network module, the first storage module, and the second storage module. The foregoing methods wherein the packets provided by the first storage module to the first storage fabric interface include packets having destination addresses corresponding to any combination of recipients, the recipients including the first compute module, the second compute module, the first network module, the second network module, the first storage module, and the second storage module.

A server including a switch fabric; an input/output interface; a symmetric multiprocessor being programmable as a selected one of at least a first configuration having one physical partition and a second configuration having a plurality of physical partitions, at least a first of the physical partitions selectively executing a first process; and the input/output interface and the symmetric multiprocessor being coupled to the switch fabric via respective fabric interfaces and whereby the input/output interface and the first process selectively exchange data by transmitting and receiving packets over the switch fabric via the fabric interfaces. The foregoing server wherein each fabric interface has a transmit data path and a receive data path, the transmit data path including logic stages performing cellification and encapsulation of the packet data prior to transmitting, the receive data path including logic stages performing complementary operations to retrieve the packet data subsequent to receiving. The foregoing servers wherein the packets transmitted to and received from the input/output interface by the first process are transferred between the first physical partition and the data paths of the symmetric multiprocessor fabric interface via a dedicated packet interface directly coupling the symmetric multiprocessor to the symmetric multiprocessor fabric interface. The foregoing servers wherein the symmetric multiprocessor is programmed in the second configuration, and at least a second of the physical partitions selectively executing a second process; and the input/output interface and the second process selectively exchange data by transmitting and receiving packets over the switch fabric via the fabric interfaces. The foregoing servers wherein the first physical partition includes a memory buffer accessible by the first process, the memory buffer being further accessible by the dedicated packet interface directly coupling the symmetric multiprocessor to the switch fabric; and the dedicated packet interface directly coupling the symmetric multiprocessor to the switch fabric selectively reads the packet data from the memory buffer and selectively writes the packet data to the memory buffer. The foregoing servers wherein the transmit data path encapsulation includes providing a fabric address based in part on a packet destination address included within the packet; and the switch fabric receives the fabric address and routes the cellified and encapsulated packet data according to the fabric address.

A system including any of the foregoing servers, the system including any combination of elements coupled to the input/output interface, the elements including a mass storage device and a network. The foregoing system wherein the network includes at least one of a storage area network, a local area network, a metro area network, a wide area network, and the Internet.

A server including a switch fabric; a network interface; a storage interface; a first symmetric multiprocessor and a second symmetric multiprocessor, each being programmable as a selected one of at least a first configuration having one physical partition and a second configuration having a plurality of physical partitions, at least a first of the physical partitions of the first symmetric multiprocessor selectively executing a first process, and at least a first of the physical partitions of the second symmetric multiprocessor selectively executing a second process; and the network interface, the storage interface, the first symmetric multiprocessor, and the second symmetric multiprocessor being coupled to the switch fabric via respective fabric interfaces and whereby the network interface, the storage interface, the first process, and the second process selectively exchange data by transmitting and receiving packets over the switch fabric via the fabric interfaces. The foregoing server wherein each fabric interface has a transmit data path and a receive data path, the transmit data path including logic stages performing cellification and encapsulation of the packet data prior to transmitting, the receive data path including logic stages performing complementary operations to retrieve the packet data subsequent to receiving. The foregoing servers wherein the packets transmitted to and received from the input/output interface by the first process are transferred between the first physical partition and the data paths of the symmetric multiprocessor fabric interface via a dedicated packet interface directly coupling the symmetric multiprocessor to the symmetric multiprocessor fabric interface.

A system including any of the foregoing servers, the system including a mass storage device coupled to the storage interface. A system including any of the foregoing servers, the system including a network coupled to the network interface. The foregoing systems further including a client coupled to the network; and wherein the first process includes an application process executed on behalf of the client, the application process producing and consuming application data, and the client selectively exchanges the application data with the first process via the network, the network interface, the fabric interface coupled to the network interface, the switch fabric, and the fabric interface coupled to the first symmetric multiprocessor. The foregoing systems wherein the network includes at least one of a storage area network, a local area network, a metro area network, a wide area network, and the Internet.

A method of performing communications between a server and a client coupled via an extended packet network, the method comprising executing an application process of the server in a symmetric multiprocessor compute module having a first physical partition, the application process executing in the first physical partition; communicating with the client via a network module having a network interface circuit coupled to the extended network; wherein each module includes an associated packet controller, each packet controller having a cell interface, a packet interface, and at least one associated packet-layer address, the modules connecting to a switch fabric via the module cell interfaces to form a packet-layer network; the application process exchanging data with the client via the network interface circuit via packets over the packet-layer network, the network interface circuit exchanging the data with the client via the extended network; in each packet controller, receiving packets from the associated module via the packet interface, emitting cells corresponding to each packet received, each cell emitted having a respective fabric address specifying an egress port of the switch fabric; further in each packet controller, emitting packets reconstructed from corresponding cells received from the switch fabric to its associated module via the packet interface; and in the switch fabric, receiving the cells and routing each cell in accordance with its respective fabric address.

The foregoing method wherein the logical and physical existence of the packet-layer network is transparent to the client and to the application process executing on the server. The foregoing methods wherein each fabric address is based at least in part on a packet-layer destination address of the corresponding packet. The foregoing methods wherein the compute module is programmable as a selected one of a first configuration having one physical partition and a second configuration having a plurality of physical partitions, each of the configurations thereby having at least the first physical partition. The foregoing methods wherein the compute module packet interface directly couples packets to at least the first physical partition. The foregoing methods wherein the network module packet interface directly couples packets to the network interface circuit. The foregoing methods wherein the packet-layer network transports the packets between the network interface circuit and the first physical partition with less than 5 micro-seconds of latency. The foregoing methods further including executing a network driver process in the first physical partition; and wherein the exchanging data with the client via the network interface includes the application process exchanging the data via interactions with the network driver, and the network driver exchanging the data with the network interface.

A method of performing communications between a server and a client coupled via an extended network, the server including a switch fabric, the method comprising executing processes in a first physical partition included in a symmetric multiprocessor compute module, the compute module further including a packet-to-cell interface having a compute cell port connected to the switch fabric and a compute packet port coupled to the first physical partition, the compute module having at least one associated packet-layer address, the processes including a server application and a network driver, the application exchanging data with the client via interactions with the network driver; and transparent to the application and the client, the network driver exchanging the data between the compute module and a network module via packets, each packet specifying a packet-layer destination address, the network module exchanging the data with the client via the extended network, the network module having a network interface coupled to the extended network, a packet-to-cell interface having a network cell port connected to the switch fabric and a network packet port, and network processing and traffic management logic coupled to the network interface and the network packet port, the network module having at least one associated packet-layer address.

The foregoing method further comprising each packet-to-cell interface sending and receiving the packets via the corresponding packet port and sending and receiving cells via the corresponding cell port, each packet-to-cell interface converting each packet received into corresponding cells and respective fabric addresses, each packet-to-cell interface assembling reconstructed packets from corresponding received cells. The foregoing methods further comprising the switch fabric receiving the cells and the respective fabric addresses and routing each cell in accordance with the respective fabric address of the cell. The foregoing methods wherein the packets addressed to the compute module from the network module are reconstructed in part by copying cells originating from the network module directly into the first physical partition and the packets addressed to the network module from the compute module are copied directly from the first physical partition, the compute packet-to-cell interface performing the copying. The foregoing methods wherein each fabric address specifies an egress port of the switch fabric and is based at least in part on the packet-layer destination address of the corresponding packet.

A computing system for performing communications between a server process and a client over an extended network, the computing system comprising a switch fabric having a plurality of fabric ports, switch logic, and switch control logic; a network module, the network module having a network interface coupled to the extended network, a packet-to-cell interface having a network cell port connected to the switch fabric and a network packet port, and network processing and traffic management logic coupled to the network interface and the network packet port, the network module having at least one associated packet-layer address; and a symmetric multiprocessor compute module, the compute module having at least a first physical partition and a packet-to-cell interface having a compute cell port connected to the switch fabric and a compute packet port coupled to the first physical partition, the compute module having at least one associated packet-layer address, the compute module executing processes in the first physical partition including a server application and a network driver, the application exchanging data with the client via interactions with the network driver, the network driver exchanging the data between the compute module and the network module via packets, each packet specifying a packet-layer destination address, the network module exchanging the data with the client via the extended network.

The foregoing system wherein each packet-to-cell interface sends and receives the packets via the packet port and sending and receiving cells via the cell port, each packet-to-cell interface converting each packet received into corresponding cells and respective fabric addresses, each packet-to-cell interface assembling reconstructed packets from corresponding received cells. The foregoing systems wherein the switch fabric receives the cells and fabric addresses via the fabric ports, each cell being coupled to the switch logic, each fabric address being coupled to the switch control logic, each cell be routed by the switch logic to a particular one the fabric ports selected by the switch control logic in accordance with the respective fabric address of the cell; and the compute packet-to-cell interface having a first data path and a second data path, the first data path reconstructing the packets addressed to the compute module from the network module in part by copying cells originating from the network module directly into the first physical partition, the second data path copying packets addressed to the network module from the compute module directly from the first physical partition. The foregoing systems wherein each fabric address specifies an egress port of the switch fabric and is based at least in part on the packet-layer destination address of the corresponding packet, A system, comprising a switch fabric having a plurality of fabric ports; at least a first input/output module, each input/output module having a respective input/output interface and at least one associated packet-layer address; at least a first symmetric multiprocessor module, each module having at least a first physical partition, each symmetric multiprocessor module having at least one associated packet-layer address, the symmetric multiprocessor module executing processes in the first physical partition; and wherein each input/output module and each symmetric multiprocessor module have a respective fabric interface connected to a respective one of the fabric ports, within each input/output module the respective fabric interface being coupled to the respective input/output interface, each input/output module and each symmetric multiprocessor module selectively exchange data by transmitting and receiving packets via their respective fabric interfaces, each of the fabric interfaces having a transmit data path and a receive data path, the transmit data path segmenting each of the transmitted packets into corresponding cells, each cell being transmitted to the switch fabric along with a respective fabric address, the switch fabric receiving the cells and the respective fabric addresses and routing each cell to the receive data path of the fabric interface connected to the fabric port specified by the respective fabric address of the cell, each receive data path receiving routed cells corresponding to at least some of the packets and reconstructing the received cells into received packets.

The foregoing system wherein the fabric interface of each symmetric multiprocessor module reconstructs the received packets by writing at least a portion of each of the received cells directly into the first physical partition. The foregoing systems wherein the fabric interface of each symmetric multiprocessor module reads the transmitted packets directly from the first physical partition prior to the conversion into the corresponding cells. The foregoing systems wherein the respective fabric address is based at least in part on the packet-layer destination address specified by the corresponding packet.

The foregoing systems further including a second symmetric multiprocessor module and wherein the first input/output module selectively exchanges data with the first and second symmetric multiprocessor modules via the transmitted and received packets. The foregoing systems further including a second symmetric multiprocessor module and wherein the first symmetric multiprocessor module selectively exchanges data with the second symmetric multiprocessor module via the transmitted and received packets. The foregoing systems further including a second input/output module and wherein the first symmetric multiprocessor module selectively exchanges data with the first and second input/output modules via the transmitted and received packets. The foregoing systems further including a second input/output module and wherein the first input/output module selectively exchanges data with the second input/output module via the transmitted and received packets. The foregoing systems wherein the first input/output module is a network input/output module and the input/output interface is an interface for an externally coupled network. The foregoing systems wherein the first input/output module is a storage input/output interface module and the input/output interface is an interface for an externally coupled storage system. The foregoing systems further including a second input/output module; and: wherein the first input/output module is a storage input/output interface module and within the first input/output module the respective input/output interface is an interface for an externally coupled storage system, and the second input/output module is a network input/output module and within the second input/output module the input/output interface is an interface for an externally coupled network Enterprise Server System FIG. 1 illustrates System 100, a conceptual representation of an embodiment of an ES system. The system includes a particular ES chassis embodiment, ES1 110, which is coupled to various other systems, including Fibre Channel Storage Network 106, Generic Packet Network 107, and Ethernet Storage Network 108. Fibre Channel Storage Network 106 provides mass storage via a collection of disks organized, for example, as a Storage Area Network (SAN). Generic Packet Network 107 conceptually includes arbitrary combinations of Local Area Network (LAN), Metro Area Network (MAN), and Wide Area Network (WAN) networks and typically includes Ethernet and Ethernet derivative links for coupling to Internet 101, an arbitrary number and arrangement of Client machines or servers, represented as Client 102 and Client 103, as well as an arbitrary number and arrangement of Personal Computers or Workstations, represented as PC 104 and PC 105. Ethernet Storage Network 108 provides mass storage via a collection of disks organized in a Network Attached Storage (NAS) or intelligent Small Computer System Interface (iSCSI) fashion.

ES1 110 includes a central I/O SF (SF 180) providing a switch fabric dataplane coupling for FCMs 120, NMs 130, SCMs 140, PMMs 150 (also known as Application Processor Modules), and OLBs 160, also known as Offload Modules. Cell-based communication is carried out over the switch fabric dataplane between the aforementioned elements coupled to it. In other words, the fabric functions as a cell-based switch. FCMs 120 include Fibre Channel Interfaces (FCIs) for coupling to Fibre Channel standard storage devices and networks (such as SANs). NMs 130 include interfaces to standard network infrastructures. PMMs 150 include compute elements for execution of Application, Driver, and Operating System (OS) processes, via SMP clusters illustrated conceptually as SMP 151. A configurable Coherency Switch Fabric and Interconnect (CSFI 170) is included for partitioning or combining the CPU and RAM resources of PMMs 150. OLBs 160 include compute elements for execution of service processes, via various service acceleration modules. Service acceleration modules include SLB accelerator 161, SSL accelerator 162, and XML accelerator 163. SCMs 140 include compute elements for providing system management, routing, and load balancing processing for SF 180 and the elements coupled to it. PMMs 150 also include FCIs for coupling to mass storage systems, such as Optional Local Disks 111-112.

In operation, Application, Driver, and OS processes are executed on PMMs 150 via CPU and RAM elements included in SMP 151. At least some of the data consumed and produced by the processes is exchanged in packets formatted as cells for communication on SF 180. The data may include network data exchanged with Generic Packet Network 107 via NMs 130, and storage data exchanged with Ethernet Storage Network 108 via NMs 130 or Fibre Channel Storage Network 106 via FCMs 120. The data may also include service data exchanged with OLBs 160 and SCMs 140, and other Application, Driver, or OS data exchanged with other elements of PMMs 150.

Data communicated on SF 180 is not limited to data exchanged with PMMs 150, but may also include data communicated between any of the modules (or fabric clients) coupled to the fabric. For example, one NM may forward packets to itself or to another NM via the fabric. An NM may also exchange packets with an OLB for processing via the fabric. SCMs 140 may also exchange system management, routing, and load balancing information with all modules coupled to the fabric via in-band packets communicated on the fabric.

In one embodiment, in conjunction with the vNIC functionality mentioned previously, a modified Ethernet Driver couples Application, Driver, and OS processes locally executing on any of SCMs 140, PMMs 150, and OLBs 160 to remote networking interfaces included on NMs 130. In this way, the locally executing processes are provided the illusion of local NIC functionality (within the corresponding SCM, PMM, and OLB where the process resides). In another embodiment, this technique may be used to access networked storage devices (i.e., NAS subsystems) via the NMs 130.

As illustrated conceptually, SF 180 includes a redundant pair of fabrics, with one of the pair typically configured as a Primary Fabric, while the other fabric is typically configured as a Redundant Fabric. SCM-Fabric coupling 149 represents two fabric dataplane couplings, a first Primary Coupling between a Primary SCM of SCMs 140 and the Primary Fabric, and a Redundant Coupling between a Redundant SCM of SCMs 140 and the Redundant Fabric. In one mode of operation, all dataplane traffic is carried on the Primary Fabric, managed by the Primary SCM, while the Redundant Fabric and the Redundant SCM are maintained in a hot-standby mode.

Further dataplane couplings to SF 180 are illustrated conceptually as FCM-Fabric coupling 129, NM-Fabric coupling 139, PMM-Fabric coupling 159, and OLB-Fabric coupling 169. In FIG. 1, each of these couplings is abstractly portrayed as a single line between each group of modules and the switch fabric. It will be understood that for the FCM, NM, and OLB modules, each module instance has a Primary Fabric coupling and a Redundant Fabric coupling. For the PMM, each PMM instance has two Primary Fabric couplings and two Redundant Fabric couplings.

All of the modules coupled to SF 180 (FCMs 120, NMs 130, SCMs 140, PMMs 150, and OLBs 160) include fabric interface communication units for exchanging data as cells on the fabric. The details of this data exchange are described in more detail elsewhere herein.

In an illustrative embodiment, the components of ES1 110 are included on a plurality of pluggable modules adapted for insertion into and removal from a backplane while the server is powered-up and operational (although software intervention to cleanly shut down or start up various processes or functions may be required). The backplane forms portions of FCM-Fabric coupling 129, NM-Fabric coupling 139, CSFI-PMM coupling 179, PMM-Fabric coupling 159, and OLB-Fabric coupling 169. The Primary Fabric of SF 180 and the associated Primary SCM of SCMs 140 are included on pluggable module Primary SIM as illustrated by SIMs 190. Similarly, the Redundant Fabric of SF 180 and the associated Redundant SCM of SCMs 140 are included on pluggable module Redundant SIM of SIMs 190. All of the modules of FCMs 120, NMs 130, PMMs 150, and OLBs 160 are also configured as pluggable modules adapted for operation with the backplane.

Each PMM of PMMs 150 is physically-partitionable, i.e. configurable into one or more physical partitions. The physical partitioning of PMMs 150 and related modes of CSFI 170 are configured under program control. For example, PMMs 150 may be configured as a single SMP complex in conjunction with CSFI 170. The result is an example of a physical partition. Each PMM of PMMs 150 may instead be configured individually as an independent SMP complex, resulting in a plurality of physical partitions, one for each PMM. Each PMM of PMMs 150 may instead be configured as a pair of SMP complexes, resulting in two physical partitions per PMM. In various embodiments, CSFI 170 may be implemented as any combination of simple interconnect, coherency logic, and switching logic, operating in conjunction with any combination of interconnect and logic included on PMMs 150. Some of these embodiments are discussed in more detail later herein.

ES1 110, as illustrated, is representative of a number of embodiments configured with various Modules to provide differing amounts of storage and network interface capability (connectivity and bandwidth), as well as differing levels of compute capability (cycles and memory). Typically, each embodiment includes at least a redundant pair of Switch Fabrics and associated System Interface Modules (for communication between Modules), at least one Processor Memory Module (for execution of Application, Driver, and OS processes), and at least one Network Module (for communication with external agents). Some embodiments may optionally further include any combination of additional Modules to provide additional interface and compute capability, up to the physical limits of the particular implementation. For example, additional Network Modules may be included in an embodiment to provide additional network bandwidth or connectivity. One or more Fibre Channel Modules may be included in an embodiment to provide additional storage bandwidth or connectivity. Additional Processor Memory Modules may be included to provide additional compute cycles or memory. One or more Offload Modules may be included to provide additional service compute cycles or memory, and these Offload Modules may each be individually configured with any combination of SLB, SSL, and XML accelerators.

In the embodiments represented by ES1 110, communication between the Modules via SF 180 is independent of the manner and arrangement of the Modules. All of the Modules communicate as peers on SF 180 and interface to the fabric in a similar manner.

System 100 is also representative of a variety of system embodiments, for example, differing in the number, type, and arrangement of storage and network systems coupled to ES1 110. For example, any combination of Optional Local Disks 111-112 may be included. Generic Packet Network 107 may include any combination of LAN, MAN, or WAN elements. FCMs 120 may be coupled to a single SAN, or a plurality of SANs. NMs 130 may be coupled to a plurality of networks or storage systems. Couplings between ES1 110 and other systems is limited only by the number and type of interfaces and physical couplings available according to implementation.

Packet and Process Data Flow

Figure 2:
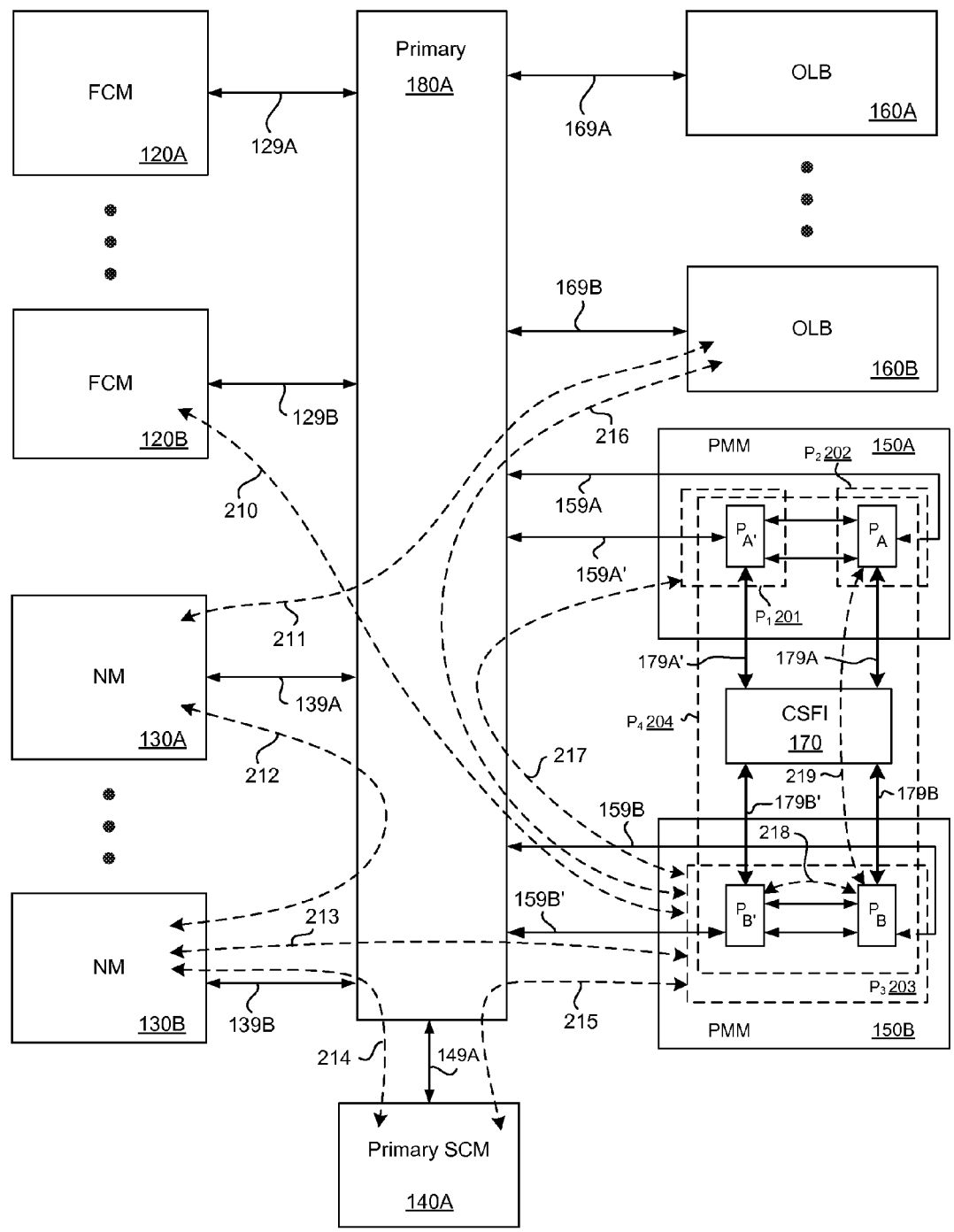
FIG. 2 illustrates various example embodiments of packet and process data flow in an ES embodiment.

FIG. 2 illustrates various example embodiments of packet and process data flow in an ES1 110 embodiment. A plurality of FCMs are illustrated by FCM 120A and FCM 120B, coupled to Primary Fabric 180A via FCM-Fabric coupling 129A and FCM-Fabric coupling 129B, respectively. A plurality of NMs are illustrated by NM 130A and NM 130B, coupled to Primary Fabric 180A via NM-Fabric coupling 139A and NM-Fabric coupling 139B, respectively. A plurality of PMMs are illustrated by PMM 150A and PMM 150B, coupled to Primary Fabric 180A by PMM-Fabric couplings 159A/159A' and PMM-Fabric couplings 159B/159B', respectively. CSFI 170 is coupled to PMM 150A and PMM 150B by CSFI-PMM coupling 179A and CSFI-PMM coupling 179B, respectively. A plurality of OLBs are illustrated by OLB 160A and OLB 160B, coupled to Primary Fabric 180A by OLB-Fabric coupling 169A and OLB-Fabric coupling 169B. Note: the Redundant SIM and associated couplings are omitted from the figure for clarity.

As a first illustrative configuration scenario, PMM 150A is shown configured as two physical partitions, $P_1$ 201, and $P_2$ 202, while PMM 150B is shown configured as a single physical partition $P_3$ 203. As a second illustrative configuration scenario, mutually exclusive with respect to the first configuration scenario, PMM 150A and PMM 150B are shown configured as a single unified physical partition $P_4$ 204.

FCM-PMM Data Exchange 210 is representative of data exchanged between an FCM and a PMM, or more specifically a physical partition of a PMM. As illustrated, this traffic is typically storage related information between processes executing on $P_3$ 203 of PMM 150B (including any of Application, Driver, or OS Processes) and a coupled storage sub-system (not shown in the figure). In operation, bidirectional packet information flows as cells via FCM-Fabric coupling 129A, Primary Fabric 180A, and PMM-Fabric coupling 159B. For example, a storage sub-system request is generated by a storage sub-system Driver process executing on $P_3$ 203. The request is formed as a packet addressed to FCM 120B, and delivered as cells to Primary Fabric 180A via PMM-Fabric coupling 159B. Primary Fabric 180A routes the cells to FCM-Fabric coupling 129B.

FCM-Fabric coupling 129B delivers the cells to FCM 120B. In turn the cells are reconstituted into packet form. A corresponding storage sub-system transaction is formed, sent to a storage sub-system attached to FCM 120B (such as Fibre Channel Storage Network 106, for example), and a response is returned. FCM 120B forms the response into one or more packets addressed to $P_3$ 203. The packets are delivered as cells to Primary Fabric 180A via FCM-Fabric coupling 129B. Primary Fabric 180A routes the cells to PMM-Fabric coupling 159B. PMM-Fabric coupling 159B reconstitutes the cells into packet form and delivers the packets to the storage sub-system Driver process executing on $P_3$ 203.

In various embodiments FCM-PMM Data Exchange 210 may flow via PMM-Fabric coupling 159B' instead of 159B, or it may flow partially via PMM-Fabric coupling 159B and partially via PMM-Fabric coupling 159B'. The operation is similar for these cases, as packets may be addressed to $P_3$ 203 via 159B and 159B' with no other change in operation.

NM-OLB Data Exchange 211 is representative of data exchanged between an NM and a service process executing on an OLB. The lower-level data exchange is substantially similar to FCM-PMM Data Exchange 210. NM 130A receives information, typically in packet form, from a coupled client (not shown in the figure), and classifies the packets, in part to determine a subset of the packets to be sent to OLB 160B. Based in part on the classification, an appropriate subset of the information is formed into packets addressed to OLB 160B, and communicated as cells to Primary Fabric 180A via NM-Fabric coupling 139A. Primary Fabric 180A routes the cells to OLB-Fabric coupling 169B, the cells are reconstituted as packets, and provided directly to the service process executing on OLB 160B. The reverse path is used to transfer information from the service process to the client coupled to NM 130A. Another path may also be used to transfer information from the service process to other destinations, such as an application process executing on a PMM.

In an example of an SSL service process executing on OLB 160B, NM 130A recognizes a variety of SSL packet forms during classification, including HyperText Transfer Protocol Secure (HTTPS) as destination port 443, Secure Simple Mail Transport Protocol (SSMTP) as destination port 465, and Secure Network News Transfer Protocol (SNNTP) as destination port 563. Equivalent packets are formed and addressed to OLB 160B. The packets are provided as cells to the fabric and routed to OLB 160B. The SSL service process executing on OLB 160B, upon receiving reconstituted packets, performs SSL service functions such as context switching, state look-up, protocol layer demultiplexing, and decryption.

The SSL service process executing on OLB 160B produces result data based in part on the packets received from NM 130A. The result data typically includes packets that may be addressed to NM 130A (a handshake or acknowledgement, for example) as illustrated by NM-OLB Data Exchange 211 or alternately addressed to $P_3$ 203 (decrypted clear text, for example) as illustrated by PMM-OLB Data Exchange 216. In both cases the packets are provided as cells to Primary Fabric 180A via OLB-Fabric coupling 169B and routed accordingly.

In an example of an SLB service process executing on OLB 160B, NM 130A recognizes TCP SYN packets during classification and forms an equivalent packet addressed to OLB 160B. The packet is provided as cells to the fabric and routed to OLB 160B. The SLB service process executing on OLB 160B, upon receiving a reconstituted packet, consults load information for the system, and assigns the request to a relatively unloaded physical partition of a PMM (such as one of $P_1$ 201, $P_2$ 202, and $P_3$ 203), establishing a new connection. The new connection is recorded in the appropriate routing and state tables, in order for NM 130A to properly address subsequent packets for the new connection to the assigned physical partition, enabling direct information flow from NM 130A to the assigned physical partition.

In one embodiment, SSL and SLB processing may be cascaded. For example, NM 130A forwards encrypted packet information from an encrypted client to OLB 160B for SSL processing, or decryption. OLB 160B in turn sends decrypted (clear text) packet information to itself, another OLB, or a PMM for subsequent SLB processing. After assignment of a physical partition relating to a new encrypted connection, packets are then sent first from NM 130A to OLB 160B for decryption, and then directly to the assigned physical partition.

In an example of an XML service executing on OLB 160B, the service process functions as an XML server. NM 130A identifies XML requests from the client, and sends the request, in the form of packets, to OLB 160B, where the XML service process analyzes the request. Appropriate response information is produced and provided as packets addressed to NM 130A.

While NM-OLB Data Exchange 211 illustrates data exchange between NM 130A and OLB 160B, this is only an illustrative scenario. For example, during classification, NM 130A may examine a packet received from the client to determine an associated flow, and then selectively determine a destination OLB based on the determined flow (OLB 160A or OLB 160B, as appropriate). This provides a form of service processing load balancing. The destination OLB may also be determined based on the type of service (SLB, SSL, or XML), if a particular OLB includes hardware acceleration specific to a service. For example, in an embodiment where OLB 160A includes an SSL hardware accelerator, while OLB 160B includes an XML hardware accelerator, then packets requiring SSL processing are typically directed to OLB 160A, and packets requiring XML processing are typically directed to OLB 160B. Those of ordinary skill in the art will recognize that destination OLB determination may be performed based on combining service processing load balancing with selection based on hardware accelerator availability and location.

Service processing (such as SLB, SSL, and XML) is not restricted to OLBs, as PMMs and SCMs may also be configured to provide service processing. In these embodiments, NMs provide the address of a physical partition of a PMM (such as $P_1$ 201, $P_2$ 202, or $P_3$ 203, for example) or an SCM (such as Primary SCM 140A, for example) as a packet destination address in preparation for transit on the fabric as cells. The cells are then routed to the appropriate PMM or SCM where the service process is executing.

NM-NM Data Exchange 212 is representative of data exchanged between NMs. This traffic is typically network traffic between a first client and a second client coupled to two NMs, and ES1 110 performs as a bridge or router. The low-level details of the data exchange are substantially similar to NM-OLB Data Exchange 211. NM 130A receives information, typically in packet form, from the first client (not shown in the figure), and classifies the packets, in part to determine a subset of the packets to be sent to NM 130B. Based in part on the classification, an appropriate subset of the information is formed into packets addressed to NM 130B, and communicated as cells to Primary Fabric 180A via NM-Fabric coupling 139A. Primary Fabric 180A routes the cells to NM 130B, the cells are reconstituted as packets, and sent to the second client (also not shown in the figure). The reverse path is used to transfer information from the second client to the first client, and operates in a symmetric manner.

Under some circumstances, such as multiple clients coupled to one NM via multiple physical network couplings, an NM may exchange data with itself via the fabric (this is not shown in the figure). Operation in this scenario is similar to NM-NM Data Exchange 212, except packets are addressed to NM 130A, instead of NM 130B.

NM-PMM Data Exchange 213 is representative of data exchanged between an NM and a process (Application, Driver, or OS) executing on a PMM, typically under control of a higher-level protocol, such as Transmission Control Protocol (TCP) or User Datagram Protocol (UDP). The data exchange is substantially similar to NM-OLB Data Exchange 211. NM 130B forms a portion of received information (based on classification) as packets addressed to $P_3$ 203, and provides the packet data as cells to Primary Fabric 180A via NM-Fabric coupling 139B. Primary Fabric 180A routes the cells to $P_3$ 203 via PMM-Fabric coupling 159B (or alternatively PMM-Fabric coupling 159B'), the cells are reconstituted as packets by PMM 150B, and provided to $P_3$ 203. The process transfers information to NM 130B (and typically on to a client coupled to the NM) using the reverse path. A return packet is formulated by the process, addressed to NM 130B, and provided as cells to Primary Fabric 180A for routing to NM 130B.

NM-SCM Data Exchange 214 is representative of data exchanged between an NM and a management, routing, or load balancing process executing on an SCM. The data exchange is substantially similar to NM-OLB Data Exchange 211. NM 130B forms a portion of received information (based on classification) as packets addressed to Primary SCM 140A, and provides the packet data as cells to Primary Fabric 180A via NM-Fabric coupling 139B. Primary Fabric 180A routes the cells to Primary SCM 140A via SCM-Fabric coupling 149A, and the cells are reassembled as packets by Primary SCM 140A and provided to the management, routing, or load balancing process. The management, routing, or load balancing process transfers information to NM 130B using the reverse path. A management packet is formulated, addressed to NM 130B, and provided as cells to Primary Fabric 180A for routing to NM 130B.

In an example of a management process executing on Primary SCM 140A, a management client coupled to NM 130B (typically for remote server management, provisioning, configuration, or other related activities) sends a management related packet to NM 130B. The packet is classified and determined to be a management related packet. The management packet is provided to the management process via Primary Fabric 180A. Return information from the management process to the management client uses the reverse path, by formulation of packets addressed to NM 130B and routed as cells by Primary Fabric 180A.

In an example of a routing process executing on Primary SCM 140A, under some circumstances NM 130B classification determines that the proper routing for a received packet is not known, i.e. the received packet is an "exception packet". In one embodiment, NM 130B provides the exception packet to the routing process via Primary Fabric 180A. The routing process examines the exception packet, routing information and state, and other routing related information, to determine the proper routing for the packet. The routing information is then recorded in the appropriate routing and state tables, in order for NM 130B to properly address subsequent packets having the same or similar classification. Primary SCM 140A also provides a correct address for the exception packet and emits a packet equivalent to the exception packet (but addressed to the correct address) as corresponding cells to Primary Fabric 180A for routing according to the correct address. In this circumstance the packet destination could be any of the elements coupled to the dataplane of Primary Fabric 180A, including NM 130B or Primary SCM 140A (this general data exchange is not illustrated in the figure).

In an example of a load balancing process executing on Primary SCM 140A, operation is similar to the SLB service executing on an OLB, except the packets are addressed to Primary SCM 140A instead of an OLB.

PMM-SCM Data Exchange 215 is representative of data exchanged between an Application, Driver, or OS process executing on a physical partition of a PMM and a management, routing, or load balancing process executing on an SCM. The data exchange is substantially similar to the exchanges described elsewhere herein. A PMM-to-SCM communication is formed as a packet addressed to Primary SCM 140A by a Driver process, for example, executing on $P_3$ 203. The packet is provided as cells via PMM-Fabric coupling 159B (or 159B'), routed via Primary Fabric 180A to Primary SCM 140A, and provided to the management, routing, or load balancing process. The reverse path is used for an SCM-to-PMM communication, with the management, routing, or load balancing process formulating a packet addressed to $P_3$ 203, for communication to the Driver process.

In an example of the load balancing process executing on Primary SCM 140A, the communication includes server load information relating to PMM 150B. PMM-SCM Data Exchange 215 is also representative of a variety of paths (not shown in the figure) between an SCM and all other elements coupled to the fabric dataplane (such as FCMs, NMs, PMMs, and OLBs), to update routing information maintained in each of the elements. The routing process executing on Primary SCM 140A formulates a packet including appropriate routing state information and addresses the packet to the appropriate destination. The packet is provided as cells to the fabric and the fabric routes the cells according to the destination. In another embodiment the destination includes a multicast destination, and the packet is delivered to a plurality of destinations by the fabric.

PMM-OLB Data Exchange 216 is representative of data exchanged between a process (Application, Driver, or OS) executing on a physical partition of a PMM and a service process executing on an OLB. The data exchange is substantially similar to PMM-SCM Data Exchange 215, except that OLB 160B takes the place of Primary SCM 140A, and data is coupled via OLB-Fabric coupling 169B instead of SCM-Fabric coupling 149A.

Data exchanges between processes executing on different physical partitions are communicated on the fabric (PMM-PMM-Fabric Data Exchange 217, for example). Data exchanges between processes executing within the same physical partition are communicated by coherent shared memory and coherent cache memory transactions (PMM-Internal Data Exchange 218, for example). When multiple PMMs are configured as a single physical partition, coherent shared memory and cohnerent cache memory transactions travel between the PMMs of the partitions via CSFI 170 (PMM-PMM-CSFI Data Exchange 219, for example).

PMM-PMM-Fabric Data Exchange 217 is representative of data exchanged between a first process and a second process executing on different physical partitions, i.e. message-passing InterProcess Communication (IPC). The two processes may be any combination of Application, Driver, or OS processes. The data exchange is substantially similar to PMM-SCM Data Exchange 215, except $P_1$ 201 takes the place of Primary SCM 140A, and data is coupled via PMM-Fabric coupling 159A' instead of SCM-Fabric coupling 149A. Another example of this type of communication would be between $P_1$ 201 and $P_2$ 202, (via PMM-Fabric coupling 159A' and PMM-Fabric coupling 159A) even though these two physical partitions are on the same PMM (this communication is not shown in the figure).

PMM-Internal Data Exchange 218 is representative of data exchanged between two processes executing on the same physical partition, and the physical partition resides entirely within a single PMM. A source process, executing on a first compute element of $P_3$ 203, writes to a shared memory location, and a sink process, executing on a second compute element of $P_3$ 203, reads the shared memory modified by the write. Communication is provided by links internal to PMM 150B supporting coherent shared memory and coherent cache memory.

PMM-PMM-CSFI Data Exchange 219 is representative of data exchanged between two processes executing on the same physical partition, the physical partition spans more than one PMM, and the two processes execute on different PMMs. An example of this physical partition configuration is illustrated as $P_4$ 204, where $P_4$ 204 includes all of the compute elements of PMM 150A and PMM 150B. Coherent shared memory and coherent cache memory transactions are used to exchange data, as in PMM-Internal Data Exchange 218. However, the transactions are communicated via CSFI 170, instead of links internal to the PMMs.

Data exchanges may also occur between processes executing on physical partitions distributed across multiple PMMs via a combination of paths similar to PMM-Internal Data Exchange 218 and PMM-PMM-CSFI Data Exchange 219. That is, particular coherent memory traffic (for both shared memory and cache memory) may travel via both CSFI 170 and via links internal to the PMMs.

Data exchanges involving an NM (such as 211, 212, 213, and 214) typically include Tag processing. Specifically, ingress packets from a first client to an NM are classified, producing a condensed representation of certain details of the packet, typically by analyzing the packet header. A portion of the classification result is represented by a Tag, and typically a portion of the Tag is included in a packet header of an egress packet from the NM produced in response to the ingress packet. Fabric egress packets to an NM (i.e. packets reconstituted from the fabric and destined for another client) typically include an egress Tag, typically located in the header of the packet. The egress Tag may specify selected packet processing operations to be performed by the NM during egress processing, thus modifying the packet header, data, or both, before receipt by a second client. Egress packet processing may be performed in response to a corresponding Tag produced during ingress processing (in an NM) or in response to a Tag 'manufactured' by a service process on an OLB or an Application, Driver, or OS process executing on a PMM. In one embodiment egress processing is specified directly by the Tag, and in another embodiment egress processing is determined indirectly by the Tag (via a table look-up, for example).

As an example, during NM-OLB Data Exchange 211, in the case of an SSL service process, the Tag provided by the NM may include information examined by the SSL process in order to perform any combination of SSL processing related context switching, SSL related per context state look-up, and early protocol layer demultiplexing.

As another example, during NM-SCM Data Exchange 214, in the case of a routing process, the exception packet delivered to the routing process may include an exception Tag providing information to determine a particular Quality of Service (QoS) for the associated routing protocol. The routing process examines the exception Tag to determine the particular route processing queue to insert the exception packet into.

In one embodiment, Primary Fabric 180A provides for only a single transport of cells at a time between any pairing of ingress and egress ports. In another embodiment, Primary Fabric 180A provides for a plurality of simultaneous transports of cells between multiple pairings of fabric ingress and egress ports. This simultaneous transport may be by parallel communication paths available in the fabric, by interleaving cells from different transports in time on a single communication path, or any combination of these and other techniques. Those of ordinary skill in the art will recognize that the details of Primary Fabric 180A operation affect only the available bandwidth and latency provided by the fabric, not details of data exchanges as exemplified by FCM-PMM Data Exchange 210, NM-OLB Data Exchange 211, and so forth. In one embodiment, Primary Fabric 180A includes sufficient parallel resources to provide substantially simultaneous communication for all of the data exchanges illustrated in the figure.

Packet Transmission and Reception

Figure 3:
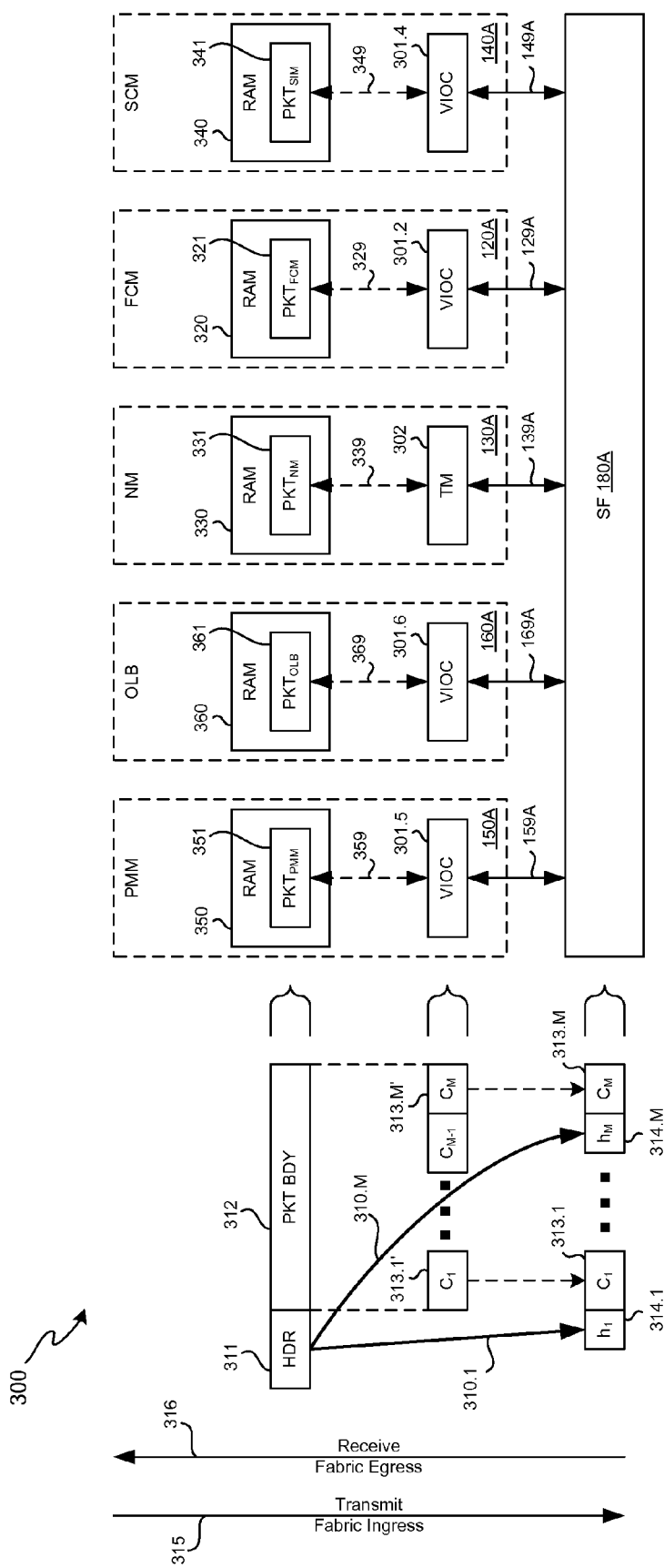
FIG. 3 illustrates selected aspects of an embodiment of packet transmission and reception in an ES embodiment.

FIG. 3 illustrates Fabric Communication 300, conceptually showing selected aspects of an embodiment of packet transmission and reception in an ES embodiment, used in FCM-PMM Data Exchange 210 and other similar data exchanges described elsewhere herein. Fabric client elements coupled to Primary Fabric 180A include PMM 150A, OLB 160A, NM 130A, FCM 120A, and Primary SCM 140A. Each of the coupled clients includes RAM, shown respectively as PMM RAM 350, OLB RAM 360, NM RAM 330, FCM RAM 320, and SCM RAM 340. Each RAM in turn includes a packet memory image, shown respectively as Packet Memory Image $PKT_{PMM}$ 351, Packet Memory Image $PKT_{OLB}$ 361, Packet Memory Image $PKT_{NM}$ 331, Packet Memory Image $PKT_{FCM}$ 321, and Packet Memory Image $PKT_{SCM}$ 341. A Virtual Input Output Controller (VIOC) is included in each of PMM 150A, OLB 160A, FCM 120A, and Primary SCM 140A, illustrated as VIOC 301.5, VIOC 301.6, VIOC 301.2, and VIOC 301.4, respectively. The VIOCs are shown conceptually coupled to corresponding packet images as dashed arrows 359, 369, 329, and 349, respectively. The VIOCs provide an interface to the fabric via PMM-Fabric coupling 159A, OLB-Fabric coupling 169A, FCM-Fabric coupling 129A, and SCM-Fabric coupling 149A, respectively.

NM 130A includes a Traffic Manager (TM 302), also known as a Buffer and Traffic Manager (BTM) instead of a VIOC. The TM is shown conceptually coupled to Packet Memory Image $PKT_{NM}$ 331 via dashed arrow 339. TM 302 provides an interface for NM-Fabric coupling 139A.

Data is exchanged between fabric clients (modules on the fabric) by procedures of packet transmission, routing (as cells) on the fabric, and packet reception. Arrow 315 conceptually shows the direction of flow for packet transmission to the fabric, also referred to as ingress to the fabric, while arrow 316 conceptually shows the direction of flow for packet reception from the fabric, also referred to as egress from the fabric. Conceptually, packet transmission begins at the source fabric client by reading a packet image from a source RAM and providing the packet as cells for transmission via the fabric. The fabric routes the cells to the appropriate destination fabric client. Packet reception conceptually begins at the fabric edge of the destination fabric client, where the cells are received from the fabric and reassembled into a corresponding packet (including information from the packet image as read from the source RAM) and written into a destination RAM in the destination fabric client.

Each of TM 302 and the VIOCs (301.5, 301.6, 301.2, and 301.4) comprise various logic blocks, including a fabric interface communication unit (also known as a packet-cell converter) for performing the functions relating to packet transmission and packet reception via cells on the fabric. The fabric communication operation of all fabric clients (PMM 150A, OLB 160A, NM 130A, FCM 120A, and Primary SCM 140A) is substantially similar, but for clarity is described in a context of data exchanged between PMM 150A and NM 130A (such as NM-PMM Data Exchange 213, for example).

For a packet transmission operation, the fabric interface communication units read a packet image from a RAM included in a fabric client (such as Packet Memory Image $PKT_{PMM}$ 351 included in PMM RAM 350). The packet image includes a header and packet body data, illustrated as Header 311 and Packet Body 312 respectively. The fabric interface communication unit (included in VIOC 301.5 in this example) conceptually segments the packet into a plurality of cells of equal length, illustrated as Cell $C_1$ 313.1' through Cell $C_{M-1}$ 313.(M−1)'. The final Cell $C_M$ 313.M' is typically a different length than the other cells as packets are not restricted to integer multiples of cell sizes.

Each of the cells are encapsulated with headers, illustrated as Cell Header $h_1$ 314.1, corresponding to Cell $C_1$ 313.1, and Cell Header $h_M$ 314.M corresponding to Cell $C_M$ 313.M. The cell headers for each of the cells segmented from a given packet are determined in part from the packet header, as shown conceptually by arrow 310.1 and arrow 310.M flowing from Header 311 to Cell Header $h_1$ 314.1 and to Cell Header $h_M$ 314.M respectively. Each of the resultant encapsulated cells is provided, in order, to the fabric for routing to the destination. Segmenting the packet into cells and encapsulating the cells is also referred to as "cellification".

Header 311 includes a packet destination address, and VIOC 301.1 determines a cell destination address in part from the destination address of the packet header in addition to routing tables and state information available to the VIOC. The cell destination address, also known as a fabric destination or egress port address, is included in each of the cell headers (Cell Header $h_1$ 314.1 through Cell Header $h_M$ 314.M).

This technique enables a process executing on a fabric client to transparently address a packet to another fabric client using a logical address for the addressed client. The resolution of the packet address to a fabric egress port address corresponds to resolving the logical address to a physical address, i.e. a specific port of the switch that the addressed client is coupled to.

The reverse direction receive path operates in a complementary, conceptually symmetric, inverse manner. The segmented cells are routed by the fabric, in order, to the fabric port specified by the cell destination address. The fabric interface communication unit included in the destination fabric client receives the cells, processes the headers, and reconstitutes the cells into a packet image in RAM, resulting in a packet image substantially similar to the packet image originally provided by the transmitting fabric client. Continuing with the example, if the destination address of Packet Memory Image $PKT_{PMM}$ 351 resolves to NM 130A, then the cells are routed to NM-Fabric coupling 139A by Primary Fabric 180A. TM 302 receives the cells via NM-Fabric coupling 139A, assembles them back into a packet, and stores the resultant image as Packet Memory Image $PKT_{NM}$ 331 in NM RAM 330.

Those of ordinary skill in the art will recognize that packet transmission and reception procedures are not limited to complete packet images in RAM. For example, on an NM, packet information flowing to the fabric may be provided, in some embodiments, directly from a network interface included on the NM, without intermediate storage in RAM. Similarly, packet information flowing from the fabric may, in some embodiments, be provided directly to the network interface without intermediate storage in RAM. The same techniques may be used on an FCM with respect to information flowing to and from the storage interface. Those of ordinary skill in the art will also recognize that the sans-header intermediate cells, Cell $C_1$ 313.1' through Cell $C_M$ 313.M', are only conceptual in nature as some embodiments implement cellification without copying packet data. Instead, packet data is accessed in-situ in cell-sized chunks and encapsulation performed on-the-fly.

The fabric interface communication units included in TMs and VIOCs further include logic adapted to allocate and manage bandwidth and priority for various flows as identified by any combination of classification information, Tag, and a sub-port portion of a fabric egress port address. This enables provisioning of bandwidth and setting of priorities for transport according to operational requirements.

In one embodiment, the particular priority at which transport is performed is selectively determined by examination of the sub-port portion of the fabric egress port address. For example, NM 130A may be configured with a high-priority queue and a low-priority queue, having corresponding high-priority and low-priority sub-port addresses. With respect to NM-PMM Data Exchange 213, for example, a portion of the data exchange may be performed via the low priority queue and another portion performed via the high-priority queue. A process desiring selective access to the high-priority queue and low-priority queue addresses packets accordingly, providing a corresponding high-priority packet destination address to high-priority packets and a corresponding low-priority packet destination address to low-priority packets. During transmission to the fabric, the high-priority packet address and the low-priority packet address are resolved by the appropriate VIOC on PMM 150B to a corresponding high-priority fabric egress port address and a corresponding low-priority egress port address. The high-priority egress port address and the low-priority egress port address include a fabric port number sub-portion that is identical for the two egress port addresses, since both packets are destined to the same pluggable module. However, the sub-port portion is different to distinguish between high and low priorities.

Upon receipt in the NM of high-priority cells and low-priority cells (corresponding to cells from packets addressed to the high-priority queue and the low-priority queue, respectively), the TM on NM 130A examines the sub-port portion of the fabric egress port addresses provided with each cell, and selectively identifies packets as associated with the high-priority queue or the low-priority queue as appropriate.

In another embodiment, the sub-port portion may also include a bandwidth allocation portion to identify one of a plurality of bandwidth allocations to associate with the packet assembled from the cell. Still other embodiments provide for combining priority and bandwidth allocation dependent processing according to the sub-port portion of the fabric egress port address. Those of ordinary skill in the art will recognize that these techniques are not limited to communication between NMs and PMMs as in the example, but may be used between all modules operating as fabric clients (such as FCMs, SCMs, and OLBs). FCMs, for example, may provide for allocation of bandwidth to various coupled storage devices or networks via the sub-port mechanism.

In one embodiment, the fabric interface communication units of TMs and VIOCs provide hardware support for a reliable message protocol in addition to packet communication. State machines implement a connection-oriented procedure including establishing a connection via a connection request and a corresponding acknowledgment, sending and receiving one or more messages using the established connection, and terminating the connection after it is no longer needed. Delivery of message content is guaranteed, using a limited number of retries, otherwise an error is returned to the sender. In operation, message images are constructed similar to packet images, with an indicator included in the message image identifying the image as a message instead of a packet. The message image includes a message header, similar in format to a packet header, and message body data, similar to packet body data. The message body data is communicated in the same manner as packet body data. The message header includes a message destination similar in format to a packet destination address. The message destination address is resolved into a cell destination address for inclusion in the cells during cellification, similar to the resolution of a packet destination address.

Pluggable Modules

FIGS. 4A-4E illustrate various embodiments of pluggable modules included in various ES embodiments. The modules share many similar characteristics. For example, each of the modules includes a fabric interface communication unit included in a TM or a VIOC. Each of the modules typically includes one or more computation and memory elements. Couplings between elements of the modules typically operate in the same or substantially similar fashion. These similarities are illustrated by common element presentation and identification, as follows.

RAM elements are shown with identifiers prefixed with 411, and these elements are typically Dynamic Random Access Memories (DRAMs) organized as Dual Inline Memory Modules (DIMMs) in some embodiments. CPU elements are shown with identifiers prefixed with 410, and these elements are typically Opteron processors. VIOC identifiers are prefixed with 301. Elements representing combined Ternary Content Addressable Memory (TCAM) and Static Random Access Memory (SRAM) identifiers are prefixed with 403. Baseboard Management Controller (BMC) elements are prefixed with 402. FCI elements are prefixed with 413, and the associated optional coupling identifiers are prefixed with 414. HyperTransport (HT) channel couplings are shown with identifiers prefixed with 460.

Those of ordinary skill in the art will recognize that while the aforementioned elements shown with common prefix identifiers are closely related to each other in operation and function, they are not identical, and may differ in various characteristics. Differences may include size, organization, bandwidth, capacity, or speed, according to embodiment. Such differences have no effect on the overall operation of the associated pluggable module.

Figure 4A:
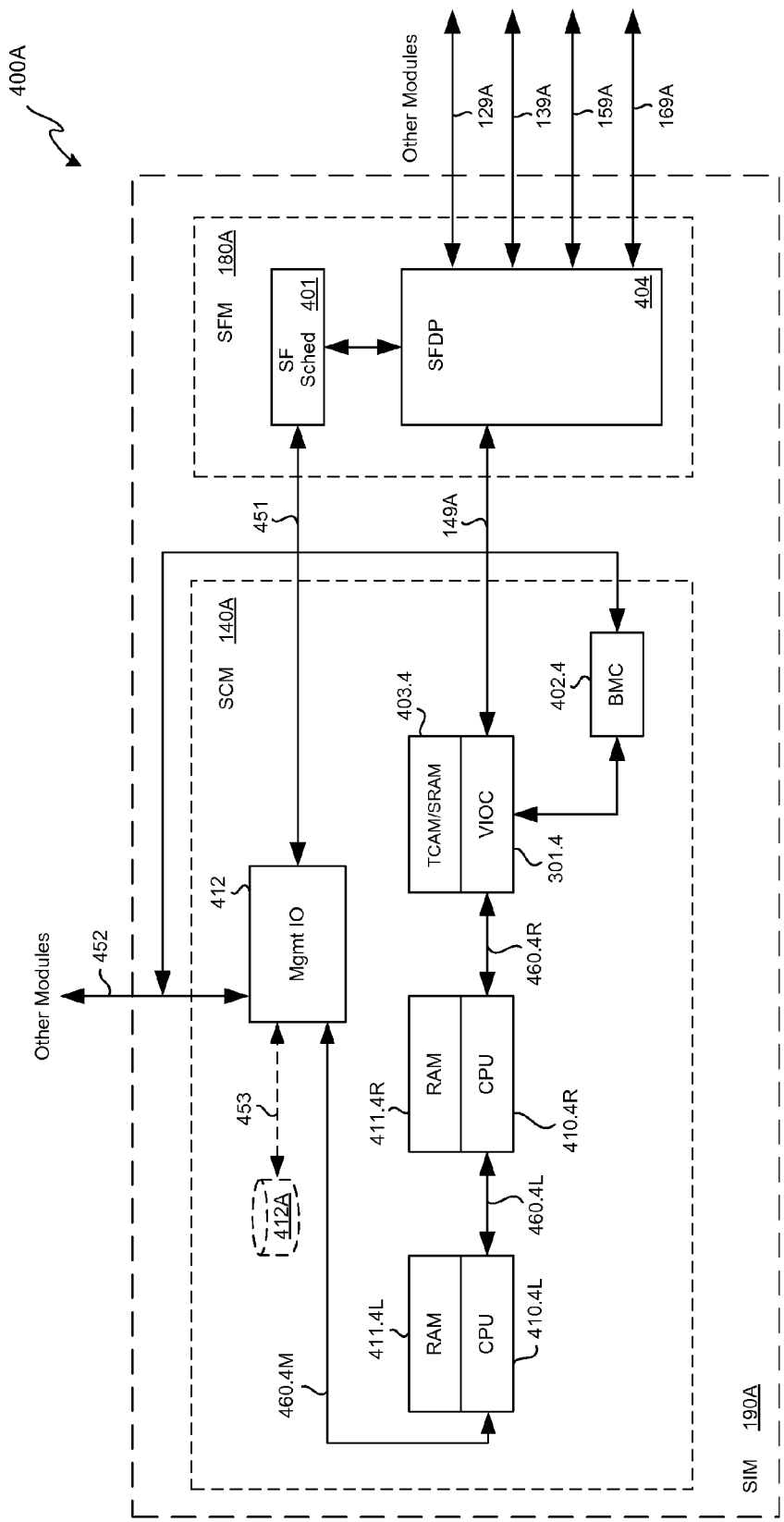
FIG. 4A illustrates selected aspects of an embodiment of a System Intelligence Module (SIM) configured as a pluggable module including a System Control Module (SCM) and an associated Switch Fabric (SF).

FIG. 4A illustrates SIM Detail 400A, including selected aspects of an embodiment of a SIM configured as a pluggable module including an SCM and an associated SF. Primary SCM 140A includes compute and associated memory elements CPU 410.4L/RAM 411.4L coupled to CPU 410.4R/RAM 411.4R via HT coupling 460.4L. VIOC 301.4 is coupled to CPU 410.4R via HT coupling 460.R. VIOC 301.4 is in communication with TCAM/SRAM 403.4. and provides a fabric interface for SCM-Fabric coupling 149A. Management I/O 412 is coupled to CPU 410.4L via HT coupling 460.4M and provides an interface to the intra-chassis BMCs via coupling 452. Primary SCM 140A also includes BMC 402.4 coupled to VIOC 301.4 and Management I/O 412. As discussed in more detail later herein, Mass Storage 412A is coupled to Management I/O 412 via coupling 453 and provides local mass storage.

Primary Fabric 180A includes SF Dataplane (SFDP) 404 coupled to SCM-Fabric coupling 149A, FCM-Fabric coupling 129A, NM-Fabric coupling 139A, PMM-Fabric coupling 159A, and OLB-Fabric coupling 169A. Primary Fabric 180A also includes SF Scheduler 401 coupled to SF Dataplane 404.

In operation, SF Dataplane 404, under the direction of SF Scheduler 401, routes data as cells provided to a fabric ingress port to a fabric egress port, according to a cell destination address, as described elsewhere herein. Each of dataplane couplings 149A, 129A, 139A, 159A, and 169A couples with a respective fabric ingress port and a respective fabric egress port.

Primary SCM 140A executes any combination of management, routing, or load balancing processes using compute and memory resources provided by CPU 410.4L/RAM 411.4L and CPU 410.4R/RAM 411.4R. The CPUs operate as a single SMP complex, communicating shared memory coherency and cache memory coherency transactions via HT coupling 460.4L.

VIOC 301.4 operates as an intelligent I/O device responding to commands from the CPUs, typically originating from a Driver process. A Driver process executing on one of the CPUs forms a packet image in one of the RAMs, including specifying a destination address for the packet, and then notifies the VIOC that a new packet is available for transmission. In response, the VIOC fabric interface communication transmit unit directly accesses the packet image from RAM via an included transmit Direct Memory Access (DMA) unit. The VIOC examines the packet header and identifies the packet destination address. The transmission of packets as cells proceeds without direct assistance from any of the processes executing on the CPUs. The packet address and other associated information are referenced in accessing routing and state information maintained in TCAM/SRAM 403.4 to determine the corresponding fabric egress port address and other related information for inclusion in headers of cells provided to the fabric to transmit the packet as cells.

VIOC 301.4 also operates as an intelligent I/O device in the reverse direction, in a conceptually symmetric fashion. Cells are received from the fabric and reassembled as packets by the VIOC fabric interface communication receive unit. In one embodiment the packet data is partially reassembled directly into a packet image stored in one of the RAMs via an included receive DMA unit. The reception of packets as cells proceeds without direct assistance from any of the processes executing on the CPUs. The VIOC notifies one or more the CPUs that new packet data is available, and subsequently a process, typically a Driver process, accesses the packet image provided in RAM and processes it accordingly.

The management process (or processes) executing on the CPUs communicate management and configuration control information via Management I/O 412 between Primary SCM 140A and other modules via coupling 452 coupled to BMCs included in PMM 150A, NM 130A, FCM 120A, OLB 160A, and Primary SCM 140A (local BMC 402.4). This communication is typically via Ethernet, and is consequently out-of-band with respect to Primary Fabric 180A. BMC 402.4 provides baseboard management functions, communicating with Management I/O 412 and VIOC 301.4. The processes executing on the CPUs of Primary SCM 140A collect selected management information from all BMCs in the server and in response to the collected information and provisioning commands received from elsewhere, provide management and configuration commands to the BMCs. Management I/O 412 also communicates configuration and control information via coupling 451 between management and routing processes executing on the CPUs and SF Scheduler 401. This provides, for example, for static or dynamic configuration of a SIM as a Primary or Redundant module.

In selected embodiments, a mass storage device (such as Mass Storage 412A) or storage network interface is available locally to provide boot images, management information, provisioning information, or log file storage. Mass Storage 412A may include any combination of mass storage device types including Flash memory, Magnetic Disk memory, and Optical Disk memory. The mass storage devices may be coupled via any combination of storage interface types including but not limited to PC Card, Compact Flash, Multi-Media Card, Memory Stick, Smart Card, Secure Digital, Universal Serial Bus (USB), FireWire, SCSI (Small Computer System Interface), IDE (Integrated Device Electronics), EIDE (Enhanced IDE) and variations and successors thereof. In other embodiments the local mass storage is omitted, and this data is accessed from mass storage devices or networks remotely via FCMs 120 or NMs 130.

Figure 4B:
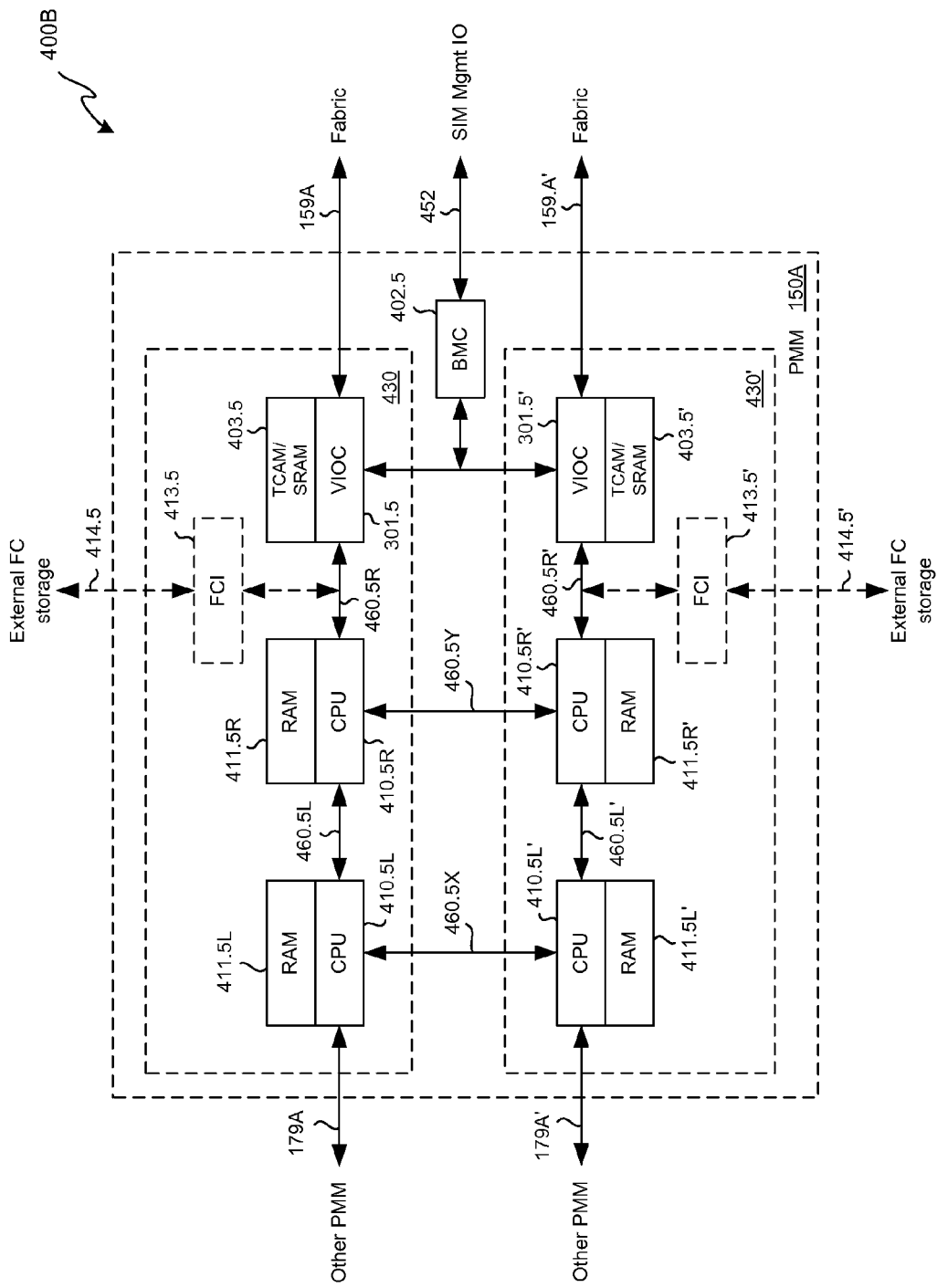
FIG. 4B illustrates selected aspects of an embodiment of a Processor Memory Module (PMM) configured as a pluggable module.

FIG. 4B illustrates PMM Detail 400B, including selected aspects of an embodiment of a PMM configured as a pluggable module. The PMM is arranged as a pair of identical sections, Half-PMM 430 and Half-PMM 430'. Each section includes two CPU/RAM elements coupled to each other by HT links, a VIOC/TCAM/SRAM element interfacing to a fabric coupling, and an optional FCI. The coupling of these elements is substantially similar to corresponding elements of Primary SCM 140A, except that Management I/O 412 is omitted. The two Half-PMMs share BMC 402.5.

The two Half-PMMs are coupled to each other by a pair of HT links (HT coupling 460.5X and HT coupling 460.5Y). One of the CPUs of each half also provides an HT interface for coupling to another PMM (not shown in the figure) via CSFI-PMM coupling 179 and CSFI-PMM coupling 179'. In one embodiment these couplings are coupled directly to another identically configured PMM, and in another embodiment these couplings are coupled indirectly to another PMM via CSFI 170. Shared memory coherency and cache memory coherency transactions are communicated over the HT couplings internal to the PMM (460.5L, 460.5X, 460.5L', and 460.5Y) and over HT couplings external to the PMM (179A, and 179A').

The HT couplings communicating shared memory coherency and cache memory coherency transactions and CSFI 170 are programmatically configurable to provide for physical partitioning of the CPU/RAM elements of PMMs. The PMM is configured as a single physical partition by programming the internal HT links (460.5L, 460.5X, 460.5L', and 460.5Y) for coherent operation, and programming the external HT links (179A, and 179A') for "isolated" (or incoherent) operation. In another embodiment, isolating a PMM for configuration as a single physical partition is performed by programmatically configuring CSFI 170 to isolate the PMM from other PMMs. The PMM is configured as a pair of identical physical partitions (Half-PMM 430 and Half-PMM 430') by programmatically configuring a portion of the internal HT links (460.5L, and 460.5L') for coherent operation, and another portion of the internal HT links (460.5X, and 460.5Y) for isolated operation. The external HT links (179A, and 179A') or CSFI 170 are also programmed for isolated operation. A plurality of PMMs are configured as a single unified physical partition by programmatically configuring all of the internal and external HT links of all of the PMMs (and also CSFI 170, depending on the embodiment) for coherent operation. Those of ordinary skill in the art will recognize that an arbitrary number and arrangement of physical partitions may be configured from PMMs 150, as limited only by the available resources, using the techniques described.

In operation, each PMM is programmatically partitioned according to provisioning information. Physical partitions can be established that have one-half of a PMM, a single PMM, or two PMMs. Application, Driver, and OS processes are executed on the resultant physical partitions. Each resultant physical partition always includes at least one VIOC. The VIOC provides for communication between the executing processes and other clients of the fabric via packet images in memory, operating as described elsewhere herein.

In selected embodiments, one or both of optional FCIs 413.5 and FCI 413.5' are included, to access boot images or related information, via couplings 414.5 and 414.5' and FCIs 413.5 and 413.5', from either a local mass storage device or via a mass storage network. In other embodiments, the optional FCIs are omitted, and this data is accessed from mass storage devices or networks remotely via FCMs 120 or NMs 130.

Those of ordinary skill in the art will recognize that CSFI 170 may be wholly or partially implemented on the SIM, or on the PMM, or any combination of the two. The coherent switch functionality may be implemented in conjunction with the HT links on the PMM, or implemented independently of these functions without substantially modifying the operation. In some embodiments, CSFI 170 is limited to interconnect operating in conjunction with coherency and switching logic implemented internal to the CPU elements included on the PMMs. In other embodiments, CSFI 170 includes some portion of coherency and switching logic operating in conjunction with coherency and switching logic included on the PMMs.

Figure 4C:
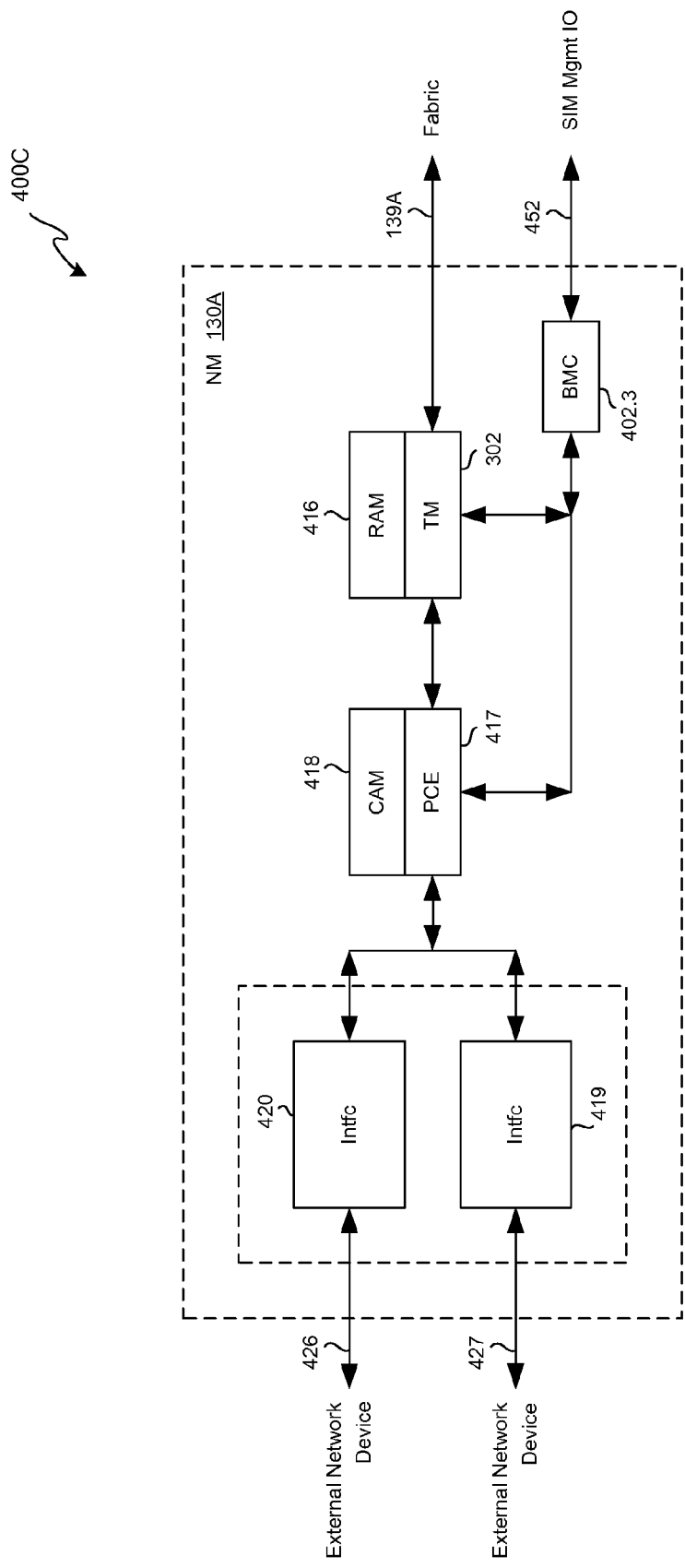
FIG. 4C illustrates selected aspects of an embodiment of a Network Module (NM) configured as a pluggable module.

FIG. 4C illustrates NM Detail 400C, including selected aspects of an embodiment of a Network Module (NM) configured as a pluggable module. NM 130A includes media interface hardware specific to a particular type of network coupling (Interfaces 420 and 419 for couplings 426 and 427, respectively), coupled to network processing elements adapted for packet processing, including Packet Classification and Editor (PCE 417) and associated CAM 418, coupled in turn to TM 302. TM 302 is in communication with RAM 416, and provides a fabric interface for NM-Fabric coupling 139A. NM 130A also includes BMC 402.3, coupled to PCE 417 and TM 302. The BMC provides an interface for coupling 452.

In operation, information (typically in the form of packets) communicated between a network device (typically external to the ES1) coupled to coupling 426 is processed at a low-level and in an interface-specific manner by Interface 420 (the operation of coupling 427 and Interface 419 is substantially similar). Packets received from the network device are provided to PCE 417 for classification and Tag determination, as described elsewhere herein. The packet data and Tag are stored in RAM 416, and provided to the fabric as cells by TM 302 via NM-Fabric coupling 139A. In the reverse direction, cells are reassembled by TM 302 as received from the fabric via NM-Fabric coupling 139A, and the resultant packets are stored in RAM 416. PCE 417 reads the stored packet data, and dynamically modifies it according to any associated Tag information, providing the result to Interface 420 for transmission to the network device via coupling 426.

TM 302 operates as a fabric interface communication unit, and includes a fabric interface communication transmit unit that directly accesses the packet image from RAM via an included DMA unit. The TM examines the packet header and identifies the packet destination address. The packet address and other associated information are referenced in accessing routing and state information maintained in one or more of CAM 418 and RAM 416. The resultant fabric egress port address and other related information are included in headers of cells provided to the fabric to transmit the packet as cells.

TM 302 also includes a fabric interface communication receive unit that operates in a conceptually symmetric fashion. Cells are received from the fabric and reassembled as packets stored into RAM 416 via an included DMA unit. The TM notifies the PCE as new packet data becomes available for editing and transport to Interface 420.

Figure 4D:
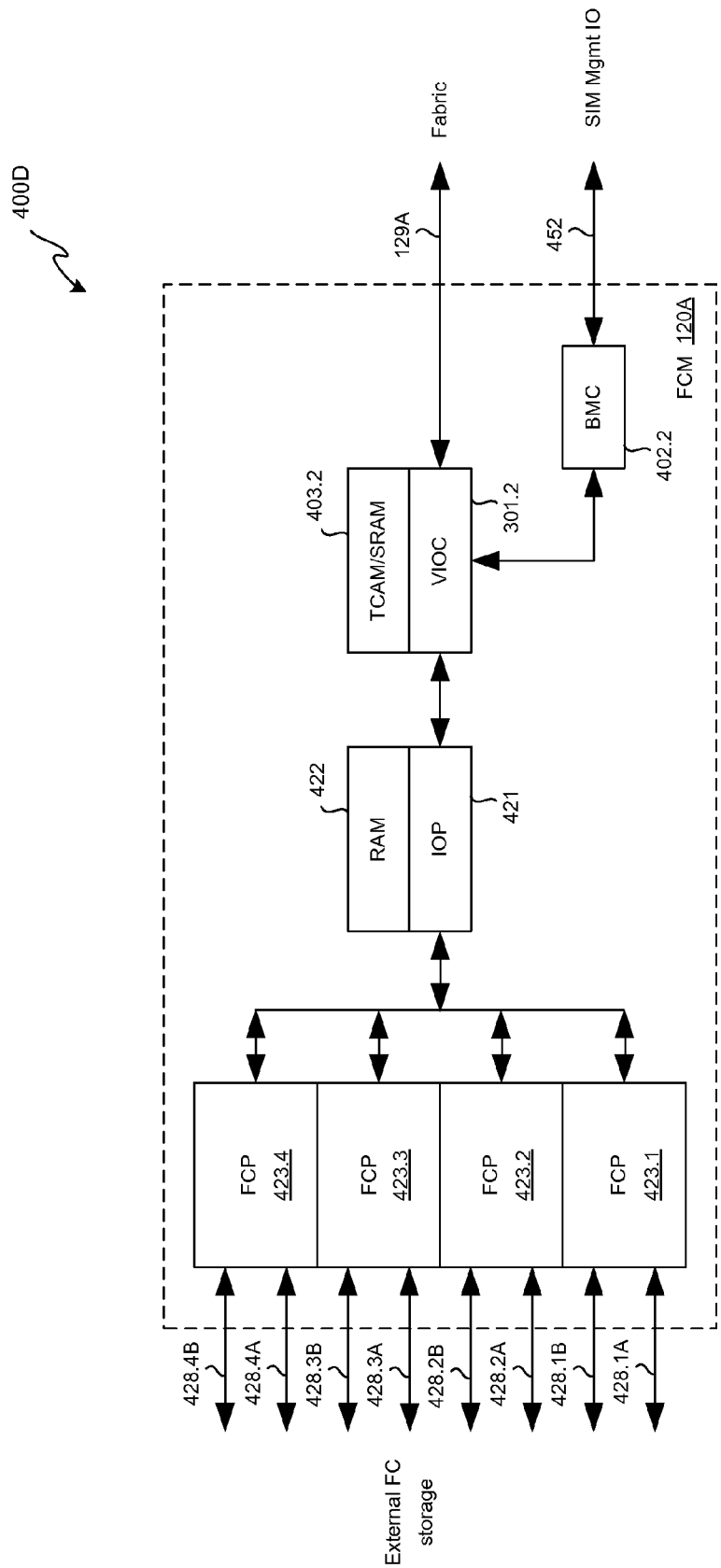
FIG. 4D illustrates selected aspects of an embodiment of a Fibre Channel Module (FCM) configured as a pluggable module.

FIG. 4D illustrates FCM Detail 400D, including selected aspects of an embodiment of an FCM configured as a pluggable module. FCM 120A includes Fibre Channel compatible couplings 428.1A through 428.4B, coupled in pairs to Fibre Channel interface Processors (FCPs 423.1-423.4). The FCPs are in turn coupled to a compute and storage element including Input Output Processor (IOP 421) and associated RAM 422, coupled in turn to VIOC 301.2. The VIOC provides a fabric interface for FCM-Fabric coupling 129A. FCM 120A also includes BMC 402.2 coupled to VIOC 301.2 and providing an interface for coupling 452.

In operation, information communicated between Fibre Channel compatible devices or networks coupled to couplings 428.1A through 428.4B is processed in a low-level manner by FCPs 423.1-423.4. Information received from external storage devices is typically stored as packets in RAM 422. After optional processing by IOP 421, packet data is transmitted as cells to the fabric by the fabric interface communication transmit unit of VIOC 301.2 via FCM-Fabric coupling 129A (as described elsewhere herein). In the reverse direction, cells are reassembled by VIOC 301.2 as received from the fabric via FCM-Fabric coupling 129A, and the resultant packets are stored in RAM 422. In one embodiment, IOP 421 reads the stored data, providing the end result to FCPs 423.1-423.4 for transmission to the coupled device or network. In an alternate embodiment, FCPs 423.1-423.4 access the data directly via DMA.

Figure 4E:
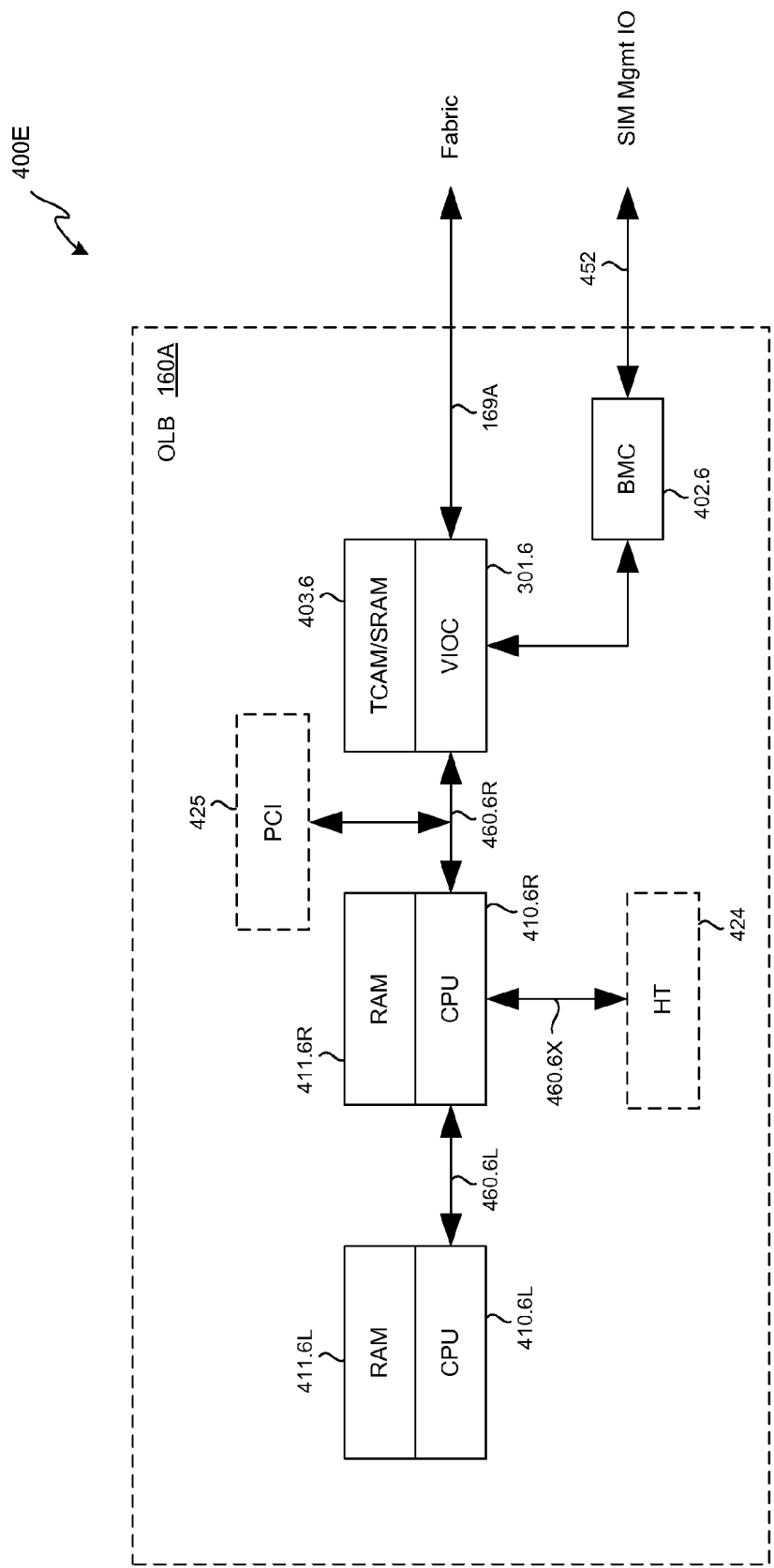
FIG. 4E illustrates selected aspects of an embodiment of an OffLoad Board (OLB) configured as a pluggable module.

FIG. 4E illustrates OLB Detail 400E, including selected aspects of an embodiment of an OLB configured as a pluggable module. OLB 160A is similar in many respects to Primary SCM 140A, and includes compute and associated memory elements CPU 410.6L/RAM 411.6L coupled to CPU 410.6R/RAM 411.6R via HT coupling 460.6L. VIOC 301.6 is coupled to CPU 410.6R via HT coupling 460.6R. VIOC 301.6 is in communication with TCAM/SRAM 403.6 and provides a fabric interface for OLB-Fabric coupling 169A. PCI sub-module 425 and HT sub-module 424 are optionally included in various combinations and configurations in several embodiments to provide additional service-specific computational capabilities as service acceleration modules. OLB 160A also includes BMC 402.6 coupled to VIOC 301.6 and providing an interface for coupling 452.

PCI sub-module 425 includes a PCI interface for interfacing PCI-adapter based devices to HT coupling 460.6R. HT sub-module 424 includes an HT interface for coupling to CPU 410.6R via coupling 460.6X. Various embodiments of PCI sub-modules and HT-sub-modules further include any number and combination of service-specific hardware accelerators according to implementation, such as an SLB hardware accelerator, an SSL hardware accelerator, and an XML hardware accelerator.

In operation, OLB 160A executes any combination of service processes (relating to SLB, SSL, or XML, for example) using compute and memory resources provided by CPU 410.6L/RAM 411.6L and CPU 410.6R/RAM 411.6R. The CPUs operate as a single SMP complex, communicating shared memory coherency and cache memory coherency transactions via HT coupling 460.6L. The VIOC provides for communication between the executing processes and other clients of the fabric via packet images in memory, operating as described elsewhere herein. Service processes executing on embodiments including any combination of PCI sub-module 425 and HT sub-module 424 accesses elements of the sub-modules in order to accelerate processing related to the service processes.

Software Layers

Figure 5:
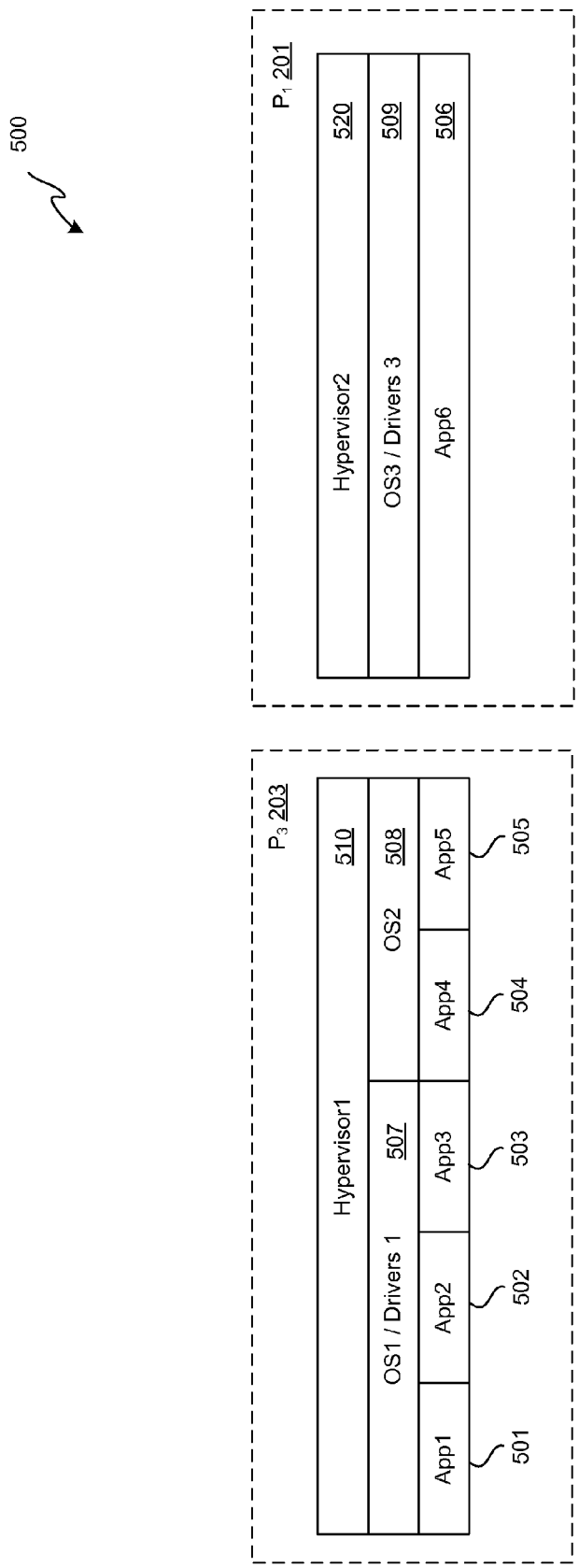
FIG. 5 illustrates selected aspects of embodiments of SoftWare (SW) layers executing in an ES embodiment.

FIG. 5 illustrates SW Layering 500, including selected aspects of embodiments of SW layers executing on PMMs of an ES embodiment. The layers are represented in a first context as executing on $P_3$ 203, and in a second context as executing on $P_1$ 201. As described elsewhere herein, $P_3$ 203 and $P_1$ 201 correspond to distinct physical partitions configured from one or more PMMs.

Illustrated at the highest SW layer level is a Hypervisor layer, as shown by Hypervisor1 510 and Hypervisor2 520. Hypervisors typically provide a software environment for executing a plurality of OS instances in an apparently concurrent manner via timesharing on a shared hardware resource, such as $P_3$ 203 or $P_1$ 201, as illustrated in the figure. At the middle SW layer level is an OS layer. As shown, Hypervisor1 510 provides two logical partitions, one for OS1/Drivers1 507, and another for OS2/Drivers2 508. Hypervisor2 520 provides a single logical partition for OS3/Drivers3 509. The lowest SW layer level, the Application layer, is provided by the OSs for executing Applications. OS1/Drivers1 507 hosts a plurality of Applications as shown by App1-App3 501-503. Similarly, OS2/Drivers2 508 hosts two applications, App4 504, and App5 505. OS3/Drivers3 509 hosts a single application, App6 506.

SW executing at the different layers typically includes a plurality of processes. For example, each of Hypervisor1 510, OS1/Drivers1 507, and App1 501 may include a plurality of processes. One example of a process included in OS1/Drivers1 507 is a Device Driver process, for example a Device Driver process corresponding to execution of the modified Ethernet Driver described elsewhere herein.

Those of ordinary skill in the art will recognize that the illustrated SW layering is only on example embodiment. Other embodiments may include more layers (such as Application sub-processes) or fewer layers (such as dedicated physical partitions requiring no Hypervisor layer). There is also no restriction as to the number and arrangement of Hypervisors, OSs, Drivers, and Applications, other than restrictions imposed by limited resources in an embodiment.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. Also, unless specifically stated to the contrary, the value ranges specified, the maximum and minimum values used, or other particular specifications (such as the quantity and type of processors and memory on the modules, the channel bandwidths, the degree of redundancy for any particular component or module, the particular version of an interface standard or component, the number of entries in a buffer), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. The names given to interconnect and logic are merely illustrative, and should not be construed as limiting the concepts taught. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in module and chassis partitioning; different module and chassis form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, omitted components are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A system for communicating a packet, the system comprising:
    means for converting a packet into cells within an input/output interface, each cell specifying a destination physical address corresponding to a first physical partition of a physically-partitionable symmetric multiprocessor;
    means for transferring each cell through a switch in accordance with the destination address;
    means for forming the cells into a reconstructed packet within the first physical partition;
    wherein the physically-partitionable symmetric multiprocessor is programmable as a selected one of a first configuration comprising one physical partition and a second configuration comprising a plurality of physical partitions;
    wherein the packet has a destination logical address and the destination physical address of each cell corresponding to the packet is based at least in part on the destination logical address of the packet;
    wherein the forming of the cells into a reconstructed packet comprises data transfers according to a direct memory access protocol; and
    wherein the input/output interface comprises at least one of a network interface and a storage interface.

2. The system of claim 1, wherein the physically-partitionable symmetric multiprocessor is programmed in the first configuration and the first physical partition is the only physical partition.

3. The system of claim 1, wherein the physically-partitionable symmetric multiprocessor is programmed in the second configuration and the first physical partition is one of the plurality of physical partitions.

4. A system of directing a packet to a process executing on a symmetric multi-processor, the system comprising:
- in an input/output interface, means for receiving a packet comprising a destination address;
- means for dividing the packet into a plurality of cells wherein each cell has a fabric address specifying an egress port of a switch fabric and wherein each fabric address is based at least in part on the packet destination address;
- means for routing each cell via the switch fabric in accordance with each cell fabric address;
- means for forming the routed cells into a reconstructed packet directly provided to the process executing on the symmetric multi-processor;
- wherein the symmetric multi-processor is programmable as a selected one of a first configuration comprising one physical partition and a second configuration comprising a plurality of physical partitions, each of the configurations thereby comprising at least a first physical partition, and the process executes in the first physical partition;
- wherein the directly providing the reconstructed packet comprises data transfers according to a direct memory access protocol; and
- wherein the input/output interface comprises at least one of a network interface and a storage interface.

5. A system, comprising:
- in a first compute module, a first fabric interface connected to a switch fabric and a first symmetric multi-processor connected to the first fabric interface, the first fabric interface comprising means for directly receiving a first-to-second packet from a first send process executing on the first symmetric multi-processor, the first fabric interface further comprising means for cellifying the first-to-second packet into first-to-second cells and emitting the first-to-second cells to the switch fabric, each cell comprising a respective fabric address specifying an egress port of the switch fabric, each fabric address being based at least in part on a first-to-second packet destination address included within the first-to-second packet;
- in a second compute module, a second fabric interface connected to the switch fabric and a second symmetric multi-processor connected to the second fabric interface, the second fabric interface comprising means for directly receiving a second-to-first packet from a second send process executing on the second symmetric multi-processor, the second fabric interface further comprising means for cellifying the second-to-first packet into second-to-first cells and emitting the second-to-first cells to the switch fabric, each cell comprising a respective fabric address specifying an egress port of the switch fabric, each fabric address being based at least in part on a second-to-first packet destination address included within the second-to-first packet;
- in the switch fabric, means for receiving the first-to-second cells and the second-to-first cells and routing each cell in accordance with its respective fabric address;
- in the first compute module, the first fabric interface further comprising means for receiving the second-to-first cells, forming the received second-to-first cells into a reconstructed second-to-first packet, and directly providing the reconstructed second-to-first packet to a first receive process executing on the first symmetric multi-processor;
- in the second compute module, the second fabric interface further comprising means for receiving the first-to-second cells, forming the received first-to-second cells into a reconstructed first-to-second packet, and directly providing the reconstructed first-to-second packet to a second receive process executing on the second symmetric multi-processor;
- wherein each of the first symmetric multi-processor and the second symmetric multi-processor are programmable as a selected one of at least a first configuration comprising one physical partition and a second configuration comprising a plurality of physical partitions;
- wherein the directly receiving the first-to-second packet and the second-to-first packet comprises data transfers according to a direct memory access read protocol; and
- wherein the directly providing the reconstructed first-to-second packet and the reconstructed second-to-first packet comprises data transfers according to a direct memory access write protocol.

* * * * *

UNITED STATES PATENT AND TRADEMARK OFFICE
CERTIFICATE OF CORRECTION

PATENT NO. : 8,458,390 B2
APPLICATION NO. : 13/430158
DATED : June 4, 2013
INVENTOR(S) : Mehrotra et al.

Page 1 of 1

It is certified that error appears in the above-identified patent and that said Letters Patent is hereby corrected as shown below:

In the Specification

In column 27, line 44, delete "conherent" and insert -- coherent --, therefor.

Signed and Sealed this
First Day of October, 2013

Teresa Stanek Rea
*Deputy Director of the United States Patent and Trademark Office*